United States Patent

Witt et al.

[11] Patent Number: 5,915,110
[45] Date of Patent: *Jun. 22, 1999

[54] BRANCH MISPREDICTION RECOVERY IN A REORDER BUFFER HAVING A FUTURE FILE

[75] Inventors: David B. Witt; Thang M. Tran, both of Austin, Tex.

[73] Assignee: Advanced Micro Devices, Inc., Sunnyvale, Calif.

[*] Notice: This patent is subject to a terminal disclaimer.

[21] Appl. No.: 08/975,011

[22] Filed: Nov. 20, 1997

Related U.S. Application Data

[63] Continuation-in-part of application No. 08/690,370, Jul. 26, 1996, Pat. No. 5,872,951.
[51] Int. Cl.⁶ .................................................. G06F 9/38
[52] U.S. Cl. ............................................ 395/586; 395/394
[58] Field of Search ................................. 395/390, 393, 395/394, 395, 586, 591, 800.23

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 395/391 |
| 4,858,105 | 8/1989 | Kuriyama et al. | 395/582 |
| 4,928,223 | 5/1990 | Dao et al. | 395/597 |
| 5,053,631 | 10/1991 | Perlman et al. | 364/748.14 |
| 5,058,048 | 10/1991 | Gupta et al. | 364/748.14 |
| 5,129,067 | 7/1992 | Johnson | 395/389 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 0679991A1 | 11/1995 | European Pat. Off. . |
| 0 724 213 A2 | 7/1996 | European Pat. Off. . |
| 2263985 | 8/1993 | United Kingdom . |
| 2263987 | 8/1993 | United Kingdom . |
| 2281422 | 3/1995 | United Kingdom . |
| WO 93/20505 | 10/1993 | WIPO . |
| 97/13201 | 4/1997 | WIPO . |

OTHER PUBLICATIONS

U.S. Application No. 08/690,385, filed Jul. 26, 1996.
U.S. Application No. 09/114,554 filed Jul. 13, 1998.
U.S. Application No. 08/690,384, filed Jul. 26, 1996.

(List continued on next page.)

*Primary Examiner*—Parshotam S. Lall
*Assistant Examiner*—Viet Vu
*Attorney, Agent, or Firm*—Conley, Rose & Tayon; Lawrence J. Merkel; B. Noel Kivlin

[57] ABSTRACT

A reorder buffer for a microprocessor comprising a control unit, an instruction storage, and future file. The future file has storage locations associated with each register implemented in the microprocessor. The future file is configured to store a reorder buffer tag that corresponds to the last instruction, in program order, stored within the instruction storage that has a destination operand corresponding to the register associated with said storage location. The future file is further configured to store instruction results. The control unit is configured to read a particular reorder buffer tag from the future file that corresponds to a completed instruction and to compare the particular reorder buffer tag with the completed instruction's result tag. If the two tags compare equal, the control unit is configured to write any result data corresponding to the completed instruction into the future file. This advantageously reduces the number of comparators needed to maintain the future file. The future file is also configured to improve branch misprediction recovery speed by examining each entry in said instruction storage for a valid destination starting with the mispredicted branch instruction. This configuration advantageously allows older instructions in the instruction storage to be retired while the future file is being recovered, thereby reducing the number of instructions the control unit must process to recover the future file.

24 Claims, 11 Drawing Sheets

U.S. PATENT DOCUMENTS

| | | | |
|---|---|---|---|
| 5,136,697 | 8/1992 | Johnson | 395/586 |
| 5,197,132 | 3/1993 | Steely, Jr. et al. | 395/393 |
| 5,226,126 | 7/1993 | McFarland et al. | 395/394 |
| 5,226,130 | 7/1993 | Favor et al. | 395/585 |
| 5,345,569 | 9/1994 | Tran | 395/393 |
| 5,355,457 | 10/1994 | Shebanow et al. | 395/394 |
| 5,446,912 | 8/1995 | Colwell | 395/393 |
| 5,524,263 | 6/1996 | Griffith | 395/800.23 |
| 5,535,346 | 7/1996 | Thomas, Jr. et al. | 395/393 |
| 5,548,776 | 8/1996 | Colwell et al. | 395/393 |
| 5,560,032 | 9/1996 | Nguyen et al. | 395/800.23 |
| 5,574,935 | 11/1996 | Vidwans et al. | 395/800.23 |
| 5,584,038 | 12/1996 | Papworth | 395/800.23 |
| 5,623,628 | 4/1997 | Brayton et al. | 711/141 |
| 5,632,023 | 5/1997 | White et al. | 395/394 |
| 5,651,125 | 7/1997 | Witt et al. | 395/394 |
| 5,689,720 | 11/1997 | Nguyen et al. | 395/376 |
| 5,737,624 | 4/1998 | Garg et al. | 395/800.23 |
| 5,768,555 | 6/1998 | Tran et al. | 395/392 |

OTHER PUBLICATIONS

U.S. Application No. 08/690,383, filed Jul. 26, 1996.

U.S. Application No. 08/711,880, filed Sep. 12, 1996.

U.S. Application No. 08/974,967, filed Nov. 20, 1997.

Intel, "Chapter 2: Microprocessor Architecture Overview," 1994, pp. 2–1 through 2–4.

Michael Slater, "AMD's K5 Designed to Outrun Pentium," Microprocessor Report, Vol. 8, No. 14, Oct. 24, 1994, 7 pp.

Sebastian Rupley and John Clyman, "P6: The Next Step?," PC Magazine, Sep. 12, 1995, 16 pages.

Tom R. Halfill, "AMD K6 Takes On Intel P6," BYTE, Jan. 1996, 4 pages.

"*Intel Architecture Software Developer's Manual, Volume 1: Basic Architecture*", Intel Corporation, Prospect IL, 1996, 1997, Chapter 8: Programming With The Intel MMX™ Technology, pp. 8–1 through 8–15.

Holstad, S., "Tutorial Tuesday: Decoding MMX" Jan. 14, 1997, Earthlink Network, Inc. copyright 1997, 5 pages. (see http://www.earthlink.net/daily/Tuesday/MMX).

"Intel MMX™ Technology —Frequently Asked Questions" 6 pp. (see http://www.intel.com/drg/mmx/support/faq/htm).

Lenell, John, "A 20MHz CMOS Reorder Buffer for a Superscalar Microprocessor," $4^{th}$ NASA Symposium on VLSI Design, 1992, pp. 2.3.1 –2.3.12.

Gaddis, et al, "FP 13.2: A 56 Entry Instruction Reorder Buffer," ISSCC96/Session 13/Microprocessors/Paper FP 13.2, 1996 IEEE International Solid–State Circuits Conference, pp. 212–213, 447.

Wallace, et al, "Design and Implementation of 100 MHz Reorder Buffer," Department of Electrical and Computer Engineering, University of California, Irvine, 0–7803–2428–May 95, 1995, IEEE, pp. 42–45.

BRANCH MISPREDICTION RECOVERY IN A REORDER BUFFER HAVING A FUTURE FILE

CROSS-REFERENCE

The present application is a continuation-in-part of application Ser. No. 08/690,370 filed Jul. 26, 1996, entitled "A Reorder Buffer Having a Future File for Storing Speculative Instruction Execution Results" by Thang M. Tran, now U.S. Pat. No. 5,872,751

BACKGROUND OF THE INVENTION

1. Field of the Invention

This invention is related to the field of superscalar microprocessors and, more particularly, to reorder buffers having future files.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

In order to increase performance, superscalar microprocessors often employ out of order execution. The instructions within a program are ordered, such that a first instruction is intended to be executed before a second instruction, etc. When the instructions are executed in the order specified, the intended functionality of the program is realized. However, instructions may be executed in any order as long as the original functionality is maintained. For example, a second instruction which does not depend upon a first instruction may be executed prior to the first instruction, even if the first instruction is prior to the second instruction in program order. A second instruction depends upon a first instruction if a result produced by the first instruction is employed as an operand of the second instruction. The second instruction is said to have a dependency upon the first instruction.

Another hazard of out of order execution occurs when two instructions update the same destination storage location. If the instruction which is second in the original program sequence executes first, then that instruction must not update the destination until the first instruction has executed. Often, superscalar microprocessors employ a reorder buffer in order to correctly handle dependency checking and multiple updates to a destination, among other things. Instructions are stored into the reorder buffer in program order, typically as the instructions are dispatched to execution units (perhaps being stored in reservation stations associated therewith). The results of the instructions are stored into the destinations from the reorder buffer in program order. However, results may be provided to the reorder buffer in any order. The reorder buffer stores each result with the instruction which generated the result until that instruction is selected for storing its result into the destination.

A reorder buffer is configured to store a finite number of instructions, defining a maximum number of instructions which may be concurrently outstanding within the superscalar microprocessor. Generally speaking, out of order execution occurs more frequently as the finite number is increased. For example, the execution of an instruction which is foremost within the reorder buffer in program order may be delayed. Instructions subsequently dispatched into the reorder buffer which are not dependent upon the delayed instruction may execute and store results in the buffer. Out of order execution may continue until the reorder buffer becomes full, at which point dispatch is suspended until instructions are deleted from the reorder buffer. Therefore, a larger number of storage locations within the reorder buffer generally leads to increased performance by allowing more instructions to be outstanding before instruction dispatch (and out of order execution) stalls.

Unfortunately, larger reorder buffers complicate dependency checking. One or more source operands of an instruction to be dispatched may be destination operands of outstanding instructions within the reorder buffer. As used herein, a source operand of an instruction is a value to be operated upon by the instruction in order to produce a result. Conversely, a destination operand is the result of the instruction. Source and destination operands of an instruction are generally referred to as operand information. An instruction specifies the location storing the source operands and the location in which to store the destination operand. An operand may be stored in a register (a "register operand") or a memory location (a "memory operand"). As used herein, a register is a storage location included within the microprocessor which is used to store instruction results. Registers may be specified as source or destination storage locations for an instruction.

The locations from which to retrieve source operands for an instruction to be dispatched are compared to the locations designated for storing destination operands of instructions stored within the reorder buffer. If a dependency is detected and the corresponding instruction has executed, the result stored in the reorder buffer may be forwarded for use by the dispatching instruction. If the instruction has not yet executed, a tag identifying the instruction may be forwarded such that the result may be provided when the instruction is executed. This tag is known as a "reorder buffer tag."

When the number of instructions storable in the reorder buffer is large, the number of comparisons for performing dependency checking is also large. Generally speaking, the total number of comparisons which must be provided for is the number of possible operands of an instruction multiplied by the number of instructions which may be concurrently dispatched, further multiplied by the number of instructions which may be stored in the reorder buffer.

One particular implementation of a reorder buffer employs a future file to reduce dependency checking complexity. The future file replaces the large block of comparators and prioritization logic ordinarily employed by reorder buffers for dependency checking. The future file includes a number of storage locations, each corresponding to a particular register implemented within the microprocessor. These storage locations are designed to store predicted future states of the microprocessor's registers for use by instructions that are executing out of order. A storage location can store either the reorder buffer tag or instruction result, if the instruction has executed, of the last instruction in program order to update the register that corresponds to that particular storage location. The reorder buffer provides the value (either reorder buffer tag or instruction result) to be stored in the storage location corresponding to a register when the register is used as a source operand for another instruction.

While future files improve the efficiency of dependency checking, they too have drawbacks. In particular, traditional implementations of reorder buffers utilizing future files suffer from slow recovery times for branch mispredictions. This is because the entire future file must be recovered after every branch misprediction.

Furthermore, while future files reduce the number of comparators used (relative to reorder buffers without future files), they still require a large number of comparators to implement dependency checking. Thus, a reorder buffer having a future file using even fewer comparators and capable of faster branch misprediction recovery is desired.

SUMMARY OF THE INVENTION

The problems outlined above are in large part solved by a reorder buffer in accordance with the present invention. A reorder buffer having features of the present invention comprises a control unit, an instruction storage, and a future file.

The instruction storage is configured to store instruction results, destination information, and reorder buffer tags corresponding to multiple instructions outstanding within a microprocessor.

The future file has a storage location associated with each register implemented in the microprocessor. Each storage location is configured to store a reorder buffer tag that corresponds to the last instruction, in program order, stored within the instruction storage that has a destination operand corresponding to the register associated with said storage location. The future file is further configured to store speculatively register values, when available, generated by the execution of the aforementioned last instruction.

The control unit, which is coupled to the instruction storage and the future file, is configured to use a completed instruction's result tag to read the completed instruction's destination operand from the instruction storage. After reading the destination operand, the control unit is configured to read the reorder buffer tag corresponding to the register identified by the destination operand from the future file. The control unit uses the destination operand read from the instruction storage to access the correct storage location within future file to read the reorder buffer tag. The control unit is also configured to compare the reorder buffer tag with the completed instruction's result tag. If the two compare equal, the control unit is configured to write any result data corresponding to the completed instruction into the future file.

This configuration may reduce the number of comparators needed to determine whether or not to write the result data into the future file because only one comparison is made for each result provided during a clock cycle, i.e., comparing the reorder buffer tag stored in the future file with the result tag from a completed instruction.

Another embodiment contemplates a reorder buffer in which the control unit is configured to recover the future file when a branch misprediction occurs. The control unit reads the entries in the instruction storage in reverse program order beginning with the mispredicted instruction. The control unit then writes a reorder buffer tag into the future file for each entry having a destination operand corresponding to a register. This configuration allows older instructions in the instruction storage to be retired while the future file is being recovered, thereby reducing the number of instructions the control unit processes during the recovery. This may in turn result in improved branch misprediction recovery times.

Another embodiment contemplates the following method of operating a reorder buffer: generating a first reorder buffer tag and a first destination operand that each correspond to a particular dispatched instruction; storing the first destination operand within the instruction storage; storing the first reorder buffer tag in a storage location within the future file if the destination operand corresponds to a particular register, wherein the storage location also corresponds to the particular register; obtaining a result tag for a particular completed instruction; reading the completed instruction's destination operand from the instruction storage using the result tag; reading a second reorder buffer tag from the future file, wherein the second reorder buffer corresponds to the completed instruction's destination operand; comparing the second reorder buffer tag with the result tag; and writing any result data associated with the completed instruction into the future file if the second reorder buffer tag and result tag are equal.

Furthermore, one embodiment contemplates the following method of recovering a reorder buffer upon a branch misprediction: examining each entry in the instruction storage for a valid destination, i.e., a destination that corresponds to a register, wherein the examining starts with the mispredicted branch instruction and continues in reverse program order; writing a reorder buffer tag into the future file for each entry in the instruction storage having a valid destination; and copying the contents of each register to a corresponding location in the future file if the corresponding location has not been previously written to during the recovery process.

BRIEF DESCRIPTION OF THE DRAWINGS

These and other features, aspects, and advantages of the invention will become apparent upon reading the following detailed description and upon reference to the accompanying drawings where.

Figure 1:
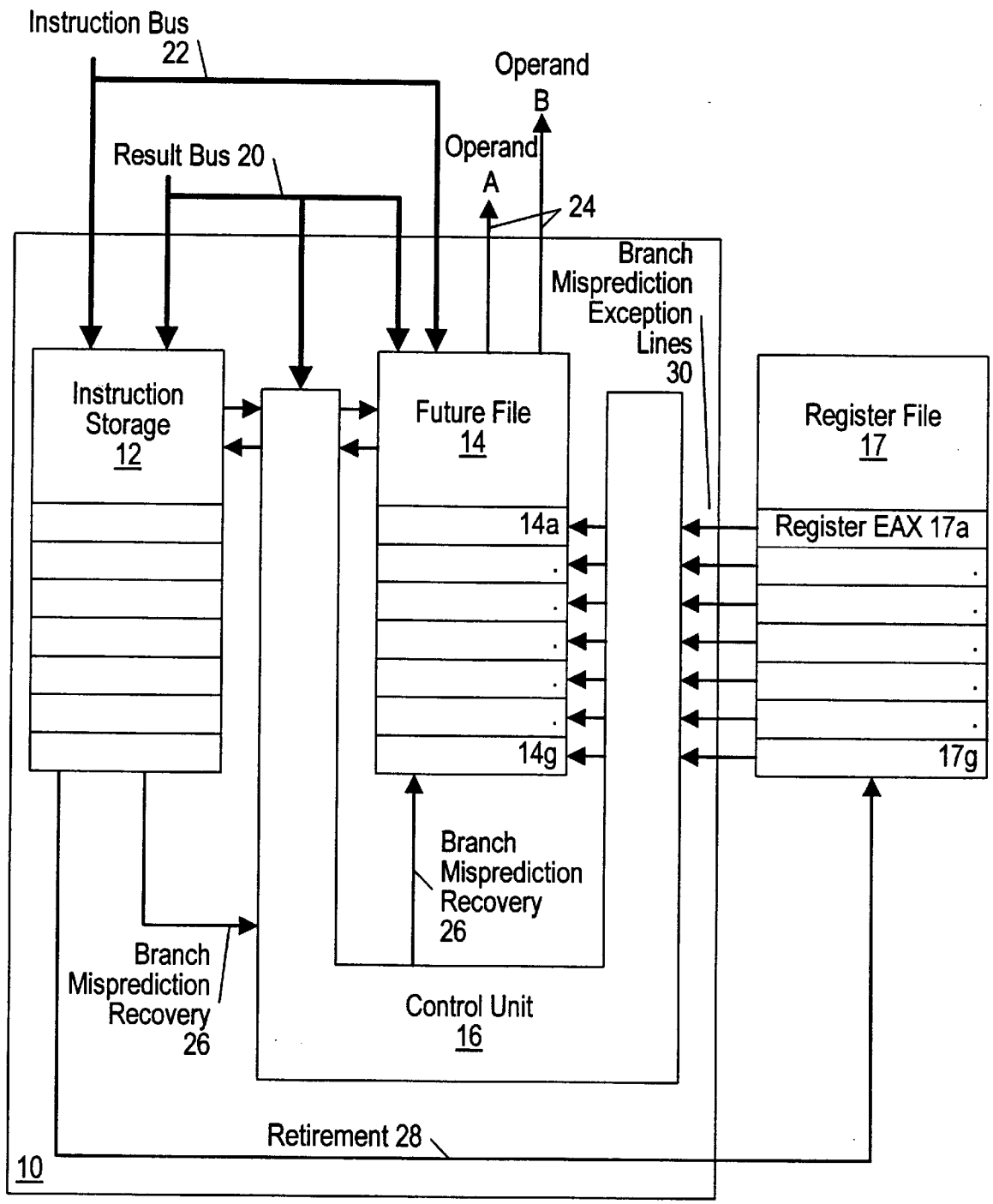
FIG. 1 is a diagram of one embodiment of the reorder buffer of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended

DETAILED DESCRIPTION

Figure 9:
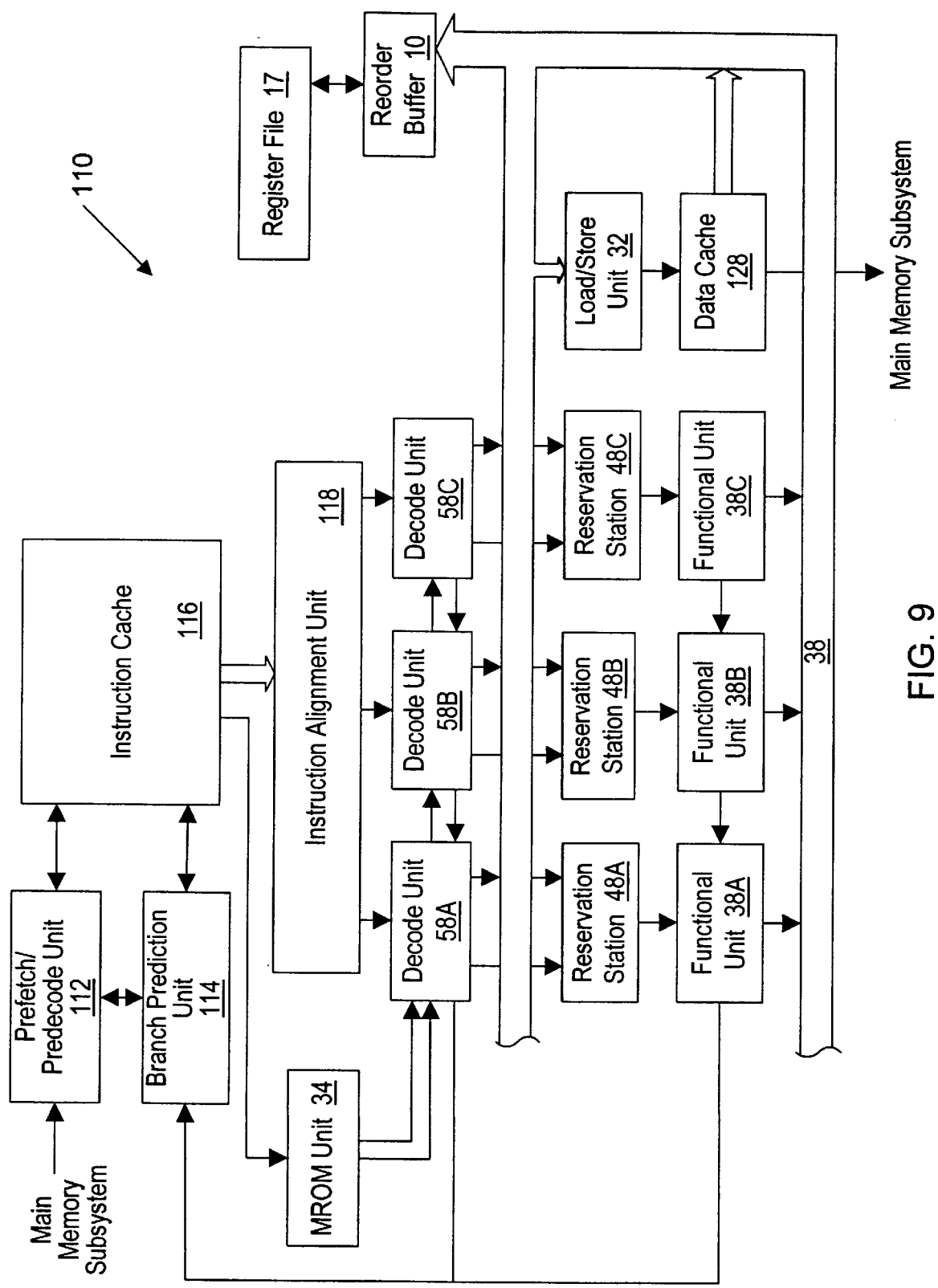
FIG. 9 is a diagram showing one embodiment of a microprocessor configured to utilize the reorder buffer of FIG. 1.

Referring now to FIG. 1, one embodiment of a reorder buffer 10 and a register file 17 is illustrated. Reorder buffer 10 comprises an instruction storage 12, a future file 14, and a control unit 16. Reorder buffer 10 is configured for use in a microprocessor (as shown in FIG. 9 and described in detail below).

Instruction storage 12 is configured to store instruction information including instruction results and destination operand information for multiple instructions which are outstanding in the microprocessor. Instruction information is stored in program order and is conveyed to instruction storage 12 over instruction bus 22. Instruction storage 12 distributes information regarding branch mispredictions to control unit 16 and future file 14 via branch misprediction recover line 26. Instruction storage 12 is also configured to "retire" instructions by writing the instruction's results into register file 17 through retirement lines 28. Results produced by functional units within the microprocessor are sent to instruction storage 12, future file 14, and control unit 16 via result bus 20. Instruction storage 12 is also configured to generate reorder buffer tags for each stored instruction. In one embodiment, the tags correspond to the instruction's position within instruction storage 12.

Future file 14 is configured to have a number of storage locations 14a through 14g, each of which correspond to a particular register within register file 17. Each storage location is configured to store a reorder buffer tag corresponding to the last instruction, in speculative program order, stored within instruction storage 12 that changes or updates the register that corresponds to that storage location. The speculative program order is generated by a branch prediction unit which determines in what order instructions are speculatively dispatched. When an instruction that updates a register is dispatched, the storage location associated with that register stores the instruction's reorder buffer tag. When the instruction is completed, the storage location stores the results if no subsequent instructions have been dispatched which update the corresponding register (i.e., the architectural register). Therefore, future file 14 contains information (either a reorder buffer tag or the instruction results) corresponding to the last instruction (in speculative program order) to update the architectural register. Advantageously, the stored information may be accessed by other parts of the microprocessor via operand data bus 24. Operand data may be configured to convey two operands per cycle. As many instructions require two register operands, this configuration may advantageous improve performance.

Referring to FIG. 1., storage location 14a corresponds to register EAX 17a. Therefore, storage location 14a is configured to store the reorder buffer tag for the last instruction (in program order) stored within instruction storage 12 to update register EAX 17a. Storage locations 14a–14g may be "initialized" by storing the reorder buffer tag upon dispatch of the instruction, i.e., when the instruction is stored in instruction storage 12. After the reorder buffer tag has been stored, each storage location 14a–14g is further configured to replace the reorder buffer tag it is storing with the corresponding instruction's results when they become available. Such instruction results are conveyed to fixture file 14 and instruction storage 12 on result bus 20.

Control unit 16 is coupled to instruction storage 12 and future file 14. After an instruction is completed, control unit 16 is configured to use the completed instruction's result tag to read the destination operand and size from instruction storage 12. An instruction is considered "completed" when its results and result tag have been returned to the reorder buffer 10 on result bus 20. After reading the destination operand and size, control unit 16 is configured to read the reorder buffer tag corresponding to the register identified by the destination operand from future file 14. Control unit 16 uses the destination operand and size information read from instruction storage 12 to access the correct storage location within future file 14 from which to read the reorder buffer tag. After control unit 16 reads the reorder buffer tag, control unit 16 is configured to compare the reorder buffer tag with the completed instruction's result tag. If the two tags compare equal, then control unit 16 writes the completed instruction's results into one of the storage locations 14a–14g within future file 14 that corresponds to the register updated by the completed instruction. This configuration ensures that future file 14 is only updated with results from the most recent instruction (in program order) stored in instruction storage 12 that modifies the contents of a particular register.

The following exemplary sequence illustrates how the configuration just described operates. Note that "dispatching" an instruction refers to putting the instruction on instruction bus 22 for access to reorder buffer 10, and the term "ROBTAG" refers to a particular reorder buffer tag.

1. MOV EAX,5 instruction (which writes immediate data "5" into EAX register) is dispatched to reorder buffer 10 on instruction bus 22
2. Instruction information for MOV EAX,5 is stored in instruction storage 12
3. ROBTAG#1 (which corresponds to MOV EAX,5) is stored in storage location 14a (which corresponds to EAX register 17a)
4. MOV EAX,ECX instruction (which copies the contents of ECX register into EAX register) is dispatched to reorder buffer 10 on instruction bus 22
5. Instruction information for MOV EAX,ECX is stored in instruction storage 12
6. ROBTAG#2 which corresponds to MOV EAX,ECX is stored in storage location 14a (which corresponds to EAX register 17a)
7. MOV EAX,5 is completed
8. Control unit 16 uses MOV EAX,5's result tag (i.e., ROBTAG#1) which is available on result bus 20 to read MOV EAX,5's size and destination operand from instruction storage 12
9. Control unit 16 uses MOV EAX,5's destination operand to read the reorder buffer tag stored in the storage location 14a (which corresponds to MOV EAX,5's destination operand, register EAX 17a)
10. Control unit 16 compares the reorder buffer tag just read (i.e., ROBTAG#1) with MOV EAX,5's result tag (i.e., ROBTAG#2)

11. As the tags are unequal, the results from MOV EAX,5 are not written to storage location 14a.

12. MOV EAX,ECX is completed

13. Control unit 16 uses MOV EAX,ECX's result tag (i.e., ROBTAG#2) which is available on result bus 20 to read MOV EAX,ECX's size and destination operand from instruction storage 12

14. Control unit 16 uses MOV EAX,ECX's destination operand to read the reorder buffer tag stored in the storage location 14a (which corresponds to MOV EAX,ECX's destination operand, register EAX 17a)

15. Control unit 16 compares the reorder buffer tag which corresponds to MOV EAX,ECX (i.e., ROBTAG#2) with the reorder buffer tag stored in storage location 14a (i.e., ROBTAG#2)

16. As the tags this time are equal, the results from MOV EAX,ECX are written to storage location 14a.

This configuration may advantageously reduce the number of comparators needed to maintain future file 10. Using this configuration only one comparison will be made per result, i.e., comparing the reorder buffer tag read from future file 14 with the completed instruction's result tag.

Other embodiments are contemplated. For example, control unit 16 may be configured to update the contents of storage locations 14a–14g with instruction results as they become available upon result bus 20. In another embodiment, reorder buffer 10 is further configured to recover future file 14 after a branch misprediction. Microprocessors often employ branch prediction in order to speculatively fetch instructions subsequent to conditional branch instructions. Branch prediction units are typically included to perform branch prediction operations. The branch direction may be "taken", in which case subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor. Furthermore, when a branch instruction is mispredicted, the contents of the future file become unreliable because an instruction that modified a storage location may have been improperly dispatched and or executed.

In yet another embodiment, result bus 20 may be configured to convey multiple results concurrently. Similarly, instruction bus 22 may be configured to convey multiple instructions concurrently. In such an embodiment, control unit 16 may perform multiple comparisons of result tags and reorder buffer tags concurrently. Accordingly, the number of comparators in control unit 16 may equal the number of results concurrently conveyed on result bus 20.

Figure 2:
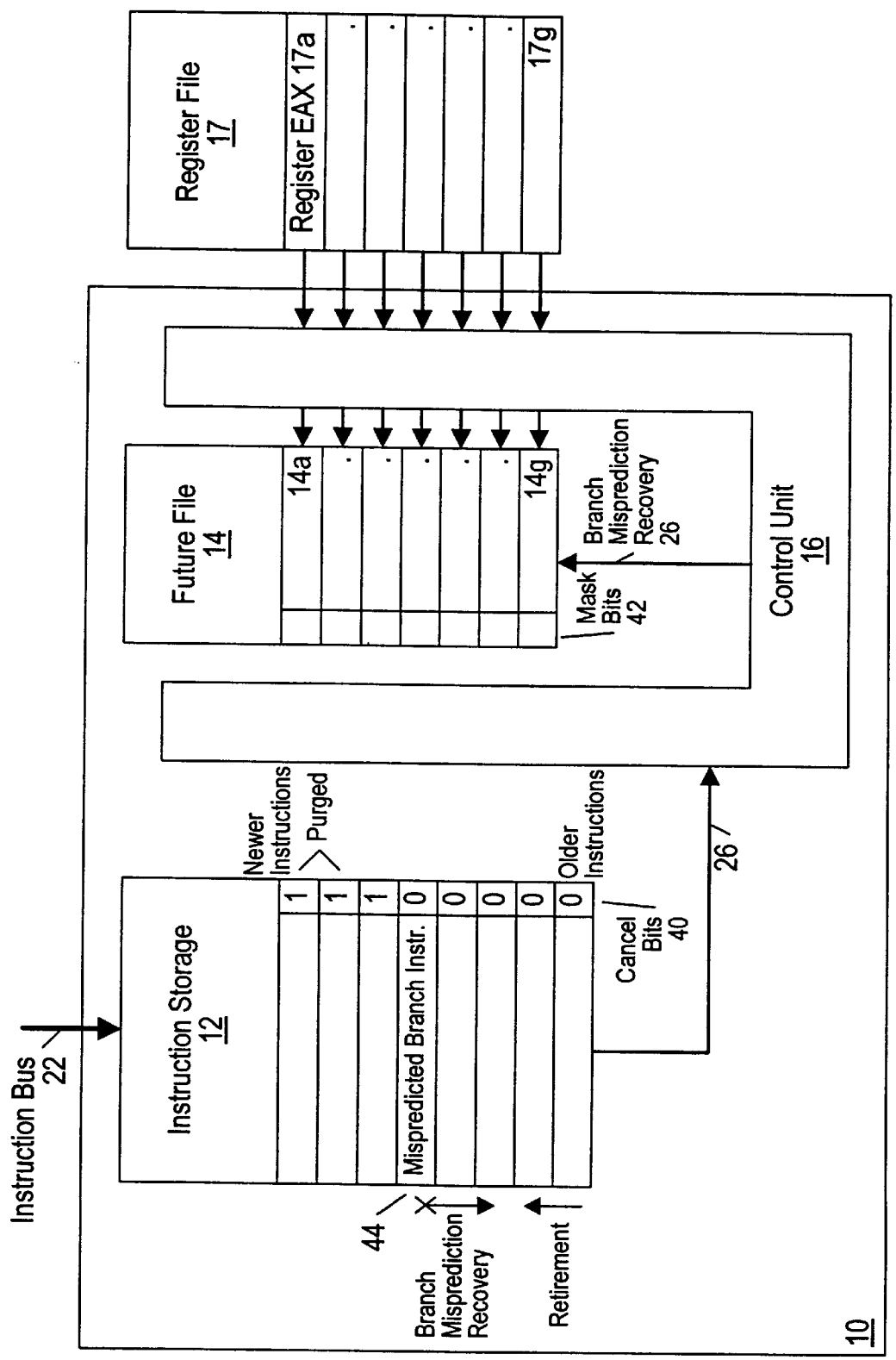
FIG. 2 is a more detailed diagram of the reorder buffer of FIG. 1.

Turning now to FIG. 2, more detail is shown of one embodiment of reorder buffer 10. FIG. 2 illustrates how future file 14 may be recovered if a branch misprediction occurs. After a branch misprediction, all entries in instruction storage 12 that follow the mispredicted branch instruction 44 in program order are purged by setting cancel bits 40. The contents of future file 14 are also invalidated by resetting mask bits 42. To recover future file 14, control unit 16 is configured to read the entries in instruction storage 12 in reverse program order, beginning with the mispredicted branch instruction 44. These instructions are read through branch misprediction recovery lines 26. For each entry that has a destination operand corresponding to a register, control unit 16 is configured to write that entry's reorder buffer tag (or result data, if available) into future file 14 and set the corresponding mask bit 42. When control unit 16 finishes reading and writing the entries, it then completes the recovery of future file 14 by copying the contents of any registers in register file 17 whose corresponding mask bits 42 have not been set in future file 14.

Figure 3:
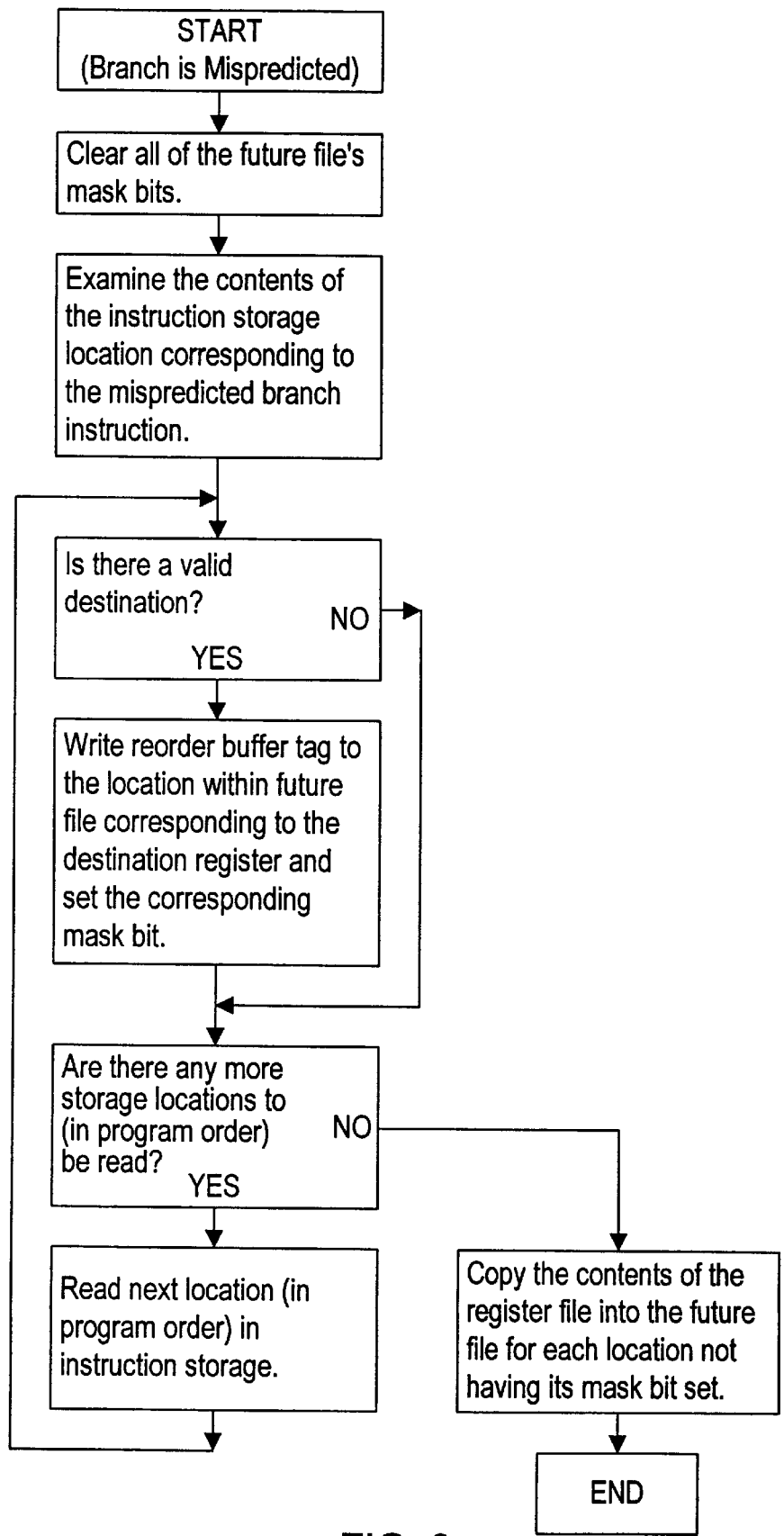
FIG. 3 is a flowchart of the method used by the reorder buffer of FIG. 2.

This recovery method is further illustrated in FIG. 3. While the embodiment illustrated in FIG. 3 is depicted serially, it should be noted that some of the steps may be performed in parallel. This method, i.e., starting recovery at the mispredicted branch instruction, may improve the recovery speed of future file 14 because instructions before the mispredicted branch instruction 44 in program order may be retired while control unit 16 is in the process of recovering future file 14. Any instructions retired during the recovery process reduce the number of instructions that control unit 16 reads and therefore may result in a faster recovery.

In yet another embodiment, instruction storage 12 is configured as a line-oriented storage. Generally speaking, a line-oriented storage allocates a line of storage to store instruction information and instruction results for one or more instructions which are concurrently dispatched by the microprocessor. The line of storage is sufficient for storing such information and results for a maximum number of concurrently dispatchable instructions within the microprocessor. The line of storage is allocated regardless of the number of instructions actually concurrently dispatched (as long as at least one instruction is dispatched). During subsequent clock cycles, different lines of storage are allocated to the subsequently dispatched instructions. Additionally, instructions within a line of storage are concurrently retired from reorder buffer 10 as well.

This configuration advantageously simplifies storage allocation within reorder buffer 10. A fixed amount of storage is allocated each time instructions are dispatched, regardless of the number of instructions. Still further, a fixed amount of storage is deallocated upon retirement of instructions. Allocation logic is thereby dependent only upon successful dispatch of one or more instructions, not upon the number of instructions concurrently dispatched.

Figure 4:
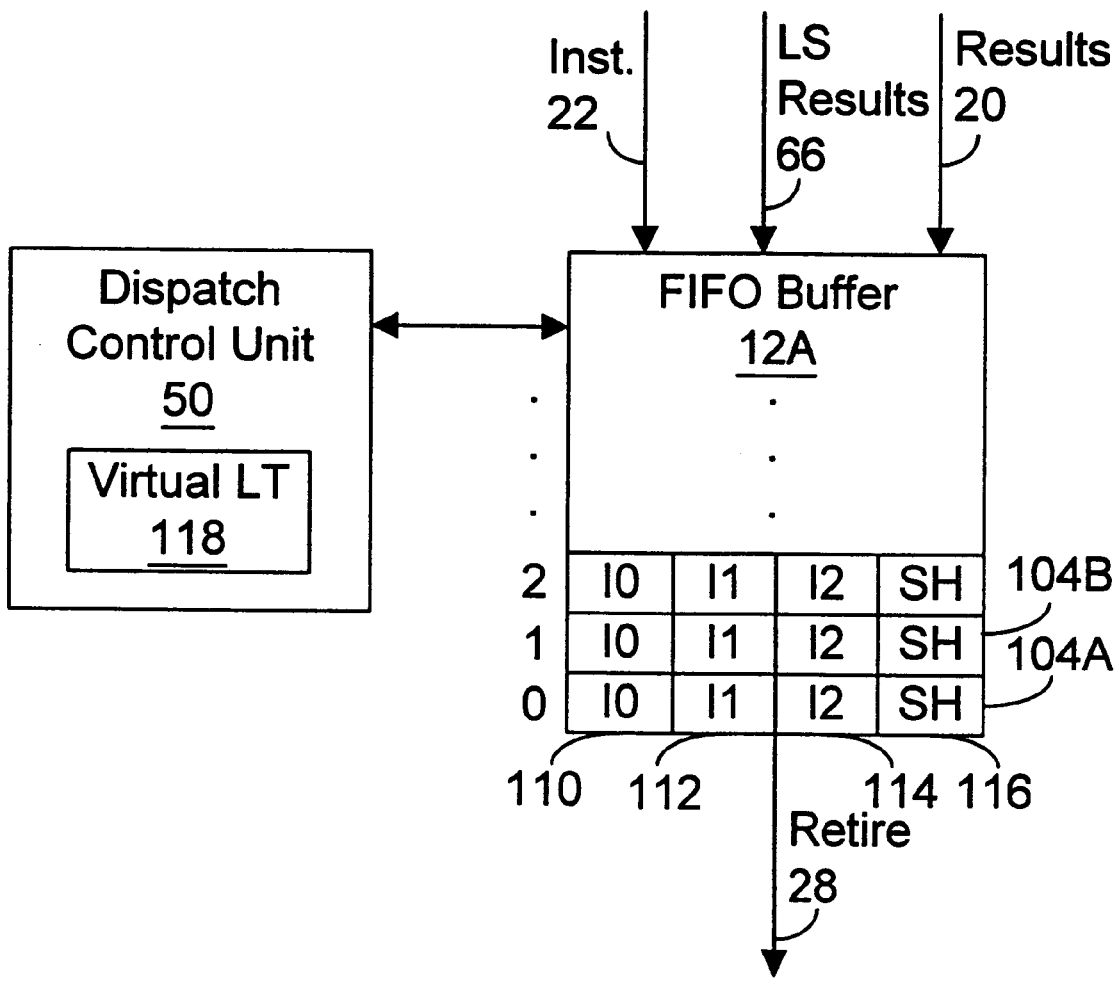
FIG. 4 is a diagram illustrating the instruction storage used in one embodiment of the present invention.

Such an embodiment is illustrated in FIG. 4. The implementation shown in FIG. 4 utilizes a first-in, first-out (FIFO) buffer 12A for instruction storage 12. A FIFO buffer generally comprises multiple storage locations which operate as a queue. As the name implies, the first item placed in a FIFO buffer is the first item to be removed from the buffer. The "items" for FIFO buffer 12A comprise lines of instructions. For example, the embodiment of FIFO buffer 12A illustrated in FIG. 4 stores up to three instructions per line. Therefore, each line of storage includes a first instruction (I0) field 110, a second instruction (I1) field 112, and a third instruction (I2) field 114. Additionally, certain information which is shared by the instructions in the line is stored in a shared (SH) field 116. A line of storage 104 is allocated to one or more concurrently dispatched instructions by dispatch control unit 50. Although the line of storage 104 shown in this implementation includes up to three instructions, other embodiments of FIFO buffers or instruction storages may include any number of instructions greater than one.

FIFO buffer 12A shifts the lines of instructions stored therein such that the oldest line of instructions is in the bottom storage location of FIFO buffer 12A (e.g. the location labeled zero in FIG. 4). The "bottom" of a FIFO buffer is the storage location which is defined to store the item which is next to be removed from the FIFO buffer. When the item at the bottom is removed, the remaining items are shifted within the FIFO buffer such that the item which was second to the bottom of the FIFO buffer becomes the item stored at the bottom. For FIFO buffer 12A, each time a line of instructions is retired, FIFO buffer 12A is shifted such that the line of instructions which was next to the bottom of FIFO buffer 12A becomes the line of instructions stored at the bottom.

Dispatch control unit 50 allocates a storage location within FIFO buffer 12A for each set of concurrently dispatched instructions received by reorder buffer 10. When FIFO buffer 12A is empty, dispatch control unit 50 allocates location zero. If location zero is occupied and location one is empty, location one is allocated. Similarly, other locations within FIFO buffer 12A are allocated if all the locations between that location and the bottom of FIFO buffer 12A are occupied with instructions. The location numbers shown in FIG. 4 next to FIFO buffer 12A are therefore physical line tags which identify one line of storage within FIFO buffer 12A from the other lines of storage within FIFO buffer 12A.

Because instruction information and results are shifted between lines of storage 104 within FIFO buffer 12A, physical line tags are unsuitable for use in identifying a particular instruction. The physical line tag changes as instructions are retired from FIFO buffer 12A. Therefore, dispatch control unit 50 assigns a virtual line tag to a set of concurrently dispatched instructions. The virtual line tag is stored in the shared field 116 of the line of storage allocated to the instructions. As the line of instructions is shifted between lines of storage 104 within FIFO buffer 12A, the virtual line tag is moved along as well.

Dispatch control unit 50 includes a storage location 118 which stores the virtual line tag to be allocated to the next set of concurrently dispatched instructions received by reorder buffer 10. When dispatch control unit 50 allocates a line of storage to the set of concurrently dispatched instructions, the virtual line tag stored in storage location 118 is incremented. If lines of instructions are discarded due to branch misprediction, the virtual line tag may be reset to the virtual line tag subsequent to the virtual line tag assigned to the mispredicted branch instruction. The virtual line tag is the tag conveyed to reservation stations, load/store units, and any other portions of the microprocessor which receive reorder buffer tags, including future file 14.

Figure 5:
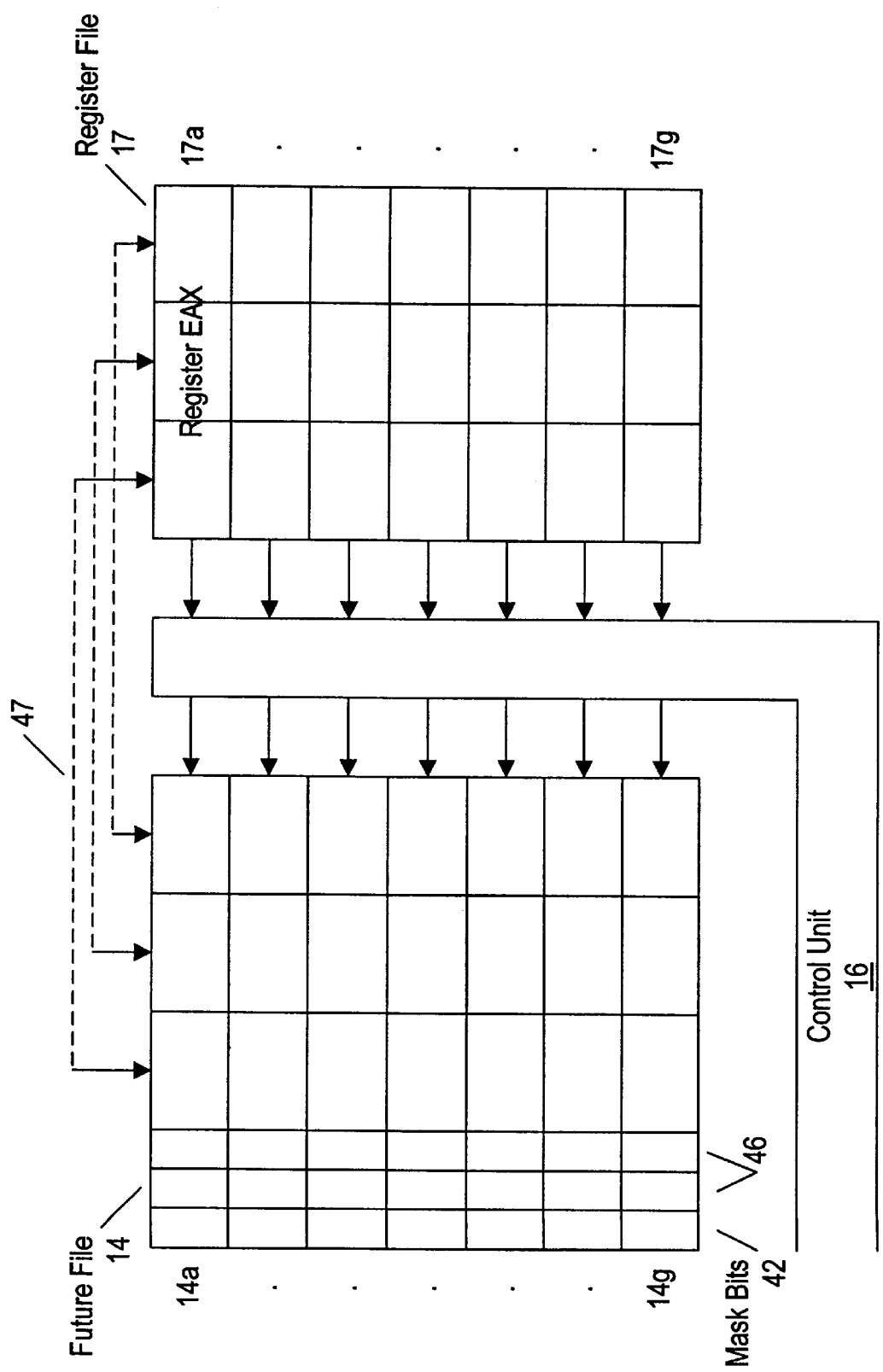
FIG. 5 is a diagram showing details of one embodiment of the future file.

In another embodiment, future file 14 may be configured to store reorder buffer tags which correspond to instructions which update different portions of a register. An example of this configuration can be seen in the embodiment illustrated in FIG. 5. Each storage location 14a through 14g within future file 14 is divided into a number of portions. Each portion corresponds to a different portion of a register in register file 17 as indicated by dashed arrows 47. Control unit 16 is configured to store instruction results into a particular portion of storage location 14a if the instruction results modify the contents of the corresponding portion of register EAX. Furthermore, control unit 16 is configured to store a particular instruction result into multiple portions if the instruction modifies multiple portions of the register file.

Such a configuration advantageously provides compatibility with architectures such as the x86 microprocessor architecture, in which an instruction may use a portion of a register for a source or destination operand. For example, in the x86 architecture, the EAX register is 32 bits. However, the least significant 16 bits of the EAX register may be accessed as the AX register. Additionally, the most significant 8 bits of the AX register may be accessed as the AH register and the least significant eight bits of the AX register may be accessed as the AL register. Therefore, multiple instructions may be outstanding which update different portions of the register.

To address the x86 register configuration described above, storage locations 14a through 14g in future file 14 are configured to store multiple tags or corresponding data. When an instruction uses a portion of a register as a source operand, the reorder buffer tag of the last instruction which updates that portion of the register is provided. Alternatively, if the instruction has been executed and has produced a result, the result is provided for that portion of the register. Additional mask bits 42 may be used to facilitate branch misprediction recovery as described above. In this embodiment, tag valid bits 46 may be used to identify which portions of future file storage locations 14a–14g are valid, as shown in more detail in FIG. 6.

Figure 6:
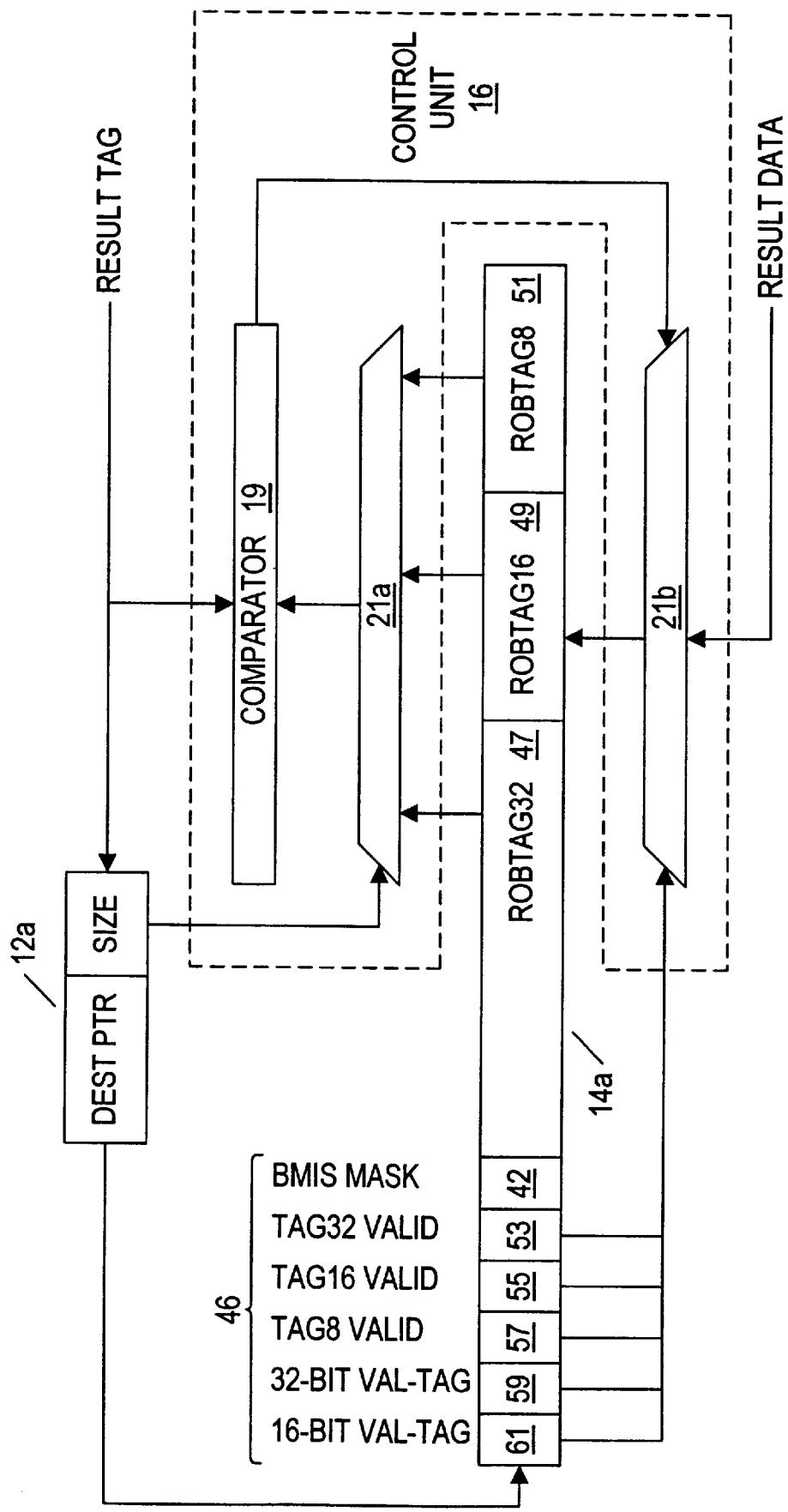
FIG. 6 is a diagram illustrating one embodiment of the control unit.

Referring now to FIG. 6, storage location 12a depicts the partial contents of one particular storage location within instruction storage 12. Storage location 12a stores, among other information, a destination pointer and size information for a particular instruction. Similarly, storage location 14a depicts the contents of a particular storage location within future file 14. Storage location 14a stores as series of tag valid bits 46, a set of branch misprediction mask bits 42 (one for each portion of the register), and three reorder buffer tags, i.e., ROBTAG32 47, ROBTAG16 49, and ROBTAG8 51. An embodiment of control unit 16 is shown wherein control unit 16 comprises a comparator 19 and multiplexers 21a and 21b.

The 16-BIT VAL-TAG bit 61 indicates whether the contents of ROBTAG16 49 and ROBTAG8 51 contain the same reorder buffer tag from an instruction that updates the lower 16-bits of a register. Similarly, 32-BIT VAL-TAG bit 61 indicates whether the contents of ROBTAG32 47, ROBTAG16 49 and ROBTAG8 51 contain the same reorder buffer tag from an instruction that updates the entire 32-bit register. The TAG8 VALID bit 57 indicates whether the contents of ROBTAG8 51 are either storing a valid reorder buffer tag (TAG8 VALID bit is set) or a result (TAG8 VALID bit is clear). Similarly, the TAG16 VALID bit 55 and the TAG32 VALID bit 53 indicate whether the contents of ROBTAG16 49 and ROBTAG32 47, respectively, are valid tags or data.

Upon instruction completion, the completed instruction's result tag and result data become available. As previously described, the result tag is used to access a particular storage location 12a within instruction storage 12. The destination pointer stored in storage location 12a is in turn used to access a particular storage location 14a within future file 14. Once the particular storage location 14a is accessed, the size information stored in storage location 12a is used by multiplexer 21a to select the proper reorder buffer tag. For example, if the size information indicates that the instruction updates all 32 bits of a register, ROBTAG*32* is selected. Comparator 19 then compares the selected reorder buffer tag with the result tag. If the tags compare equal, comparator 19 enables the output of multiplexer 21b to write the results into storage location 14a. Multiplexer 21b receives the tag valid bits stored within storage location 47 to determine which locations the result data may be written into. The following sequence illustrates how this embodiment operates:

1. Instruction A (Inst. A), which updates all 32-bits of register EAX, is dispatched.
2. Inst. A's information is stored in storage location 12a and ROBTAG#1 is generated.
3. ROBTAG#1 is written into ROBTAG32 47, ROBTAG16 49, and ROBTAG8 51; The 32-BIT VAL-TAG 59 is set, as are the tag valid bits for ROBTAG32 47, ROBTAG16 49 and ROBTAG8 51, i.e., TAG8 VALID 57, TAG16 VALID 55, and TAG32 VALID 53, respectively.

4. Instruction B (Inst. B), which updates only the lowest 8-bits of register EAX (i.e. register AL) is dispatched.
5. Inst. B's information is stored in a storage location (not shown) and ROBTAG#2 is generated.
6. ROBTAG#2 is written into ROBTAG8 51; The 32-BIT VAL-TAG 59 is cleared to indicate that the contents of ROBTAG32 47, ROBTAG16 49, and ROBTAG8 51 are not all copies of the same reorder buffer tag. The TAG8 VALID 57 tag is set.
7. Inst. A is completed and its result tag and data are available.
8. Inst. A's result tag is used to select storage location 12a, which in turn is used to select storage location 14a within future file 14.
9. Inst. A's stored size information in storage location 12a is used by multiplexer 21a to select the contents of ROBTAG32 47.
10. Comparator 19 compares the contents of ROBTAG32 47 (i.e. ROBTAG#1) and Inst. A's result tag and finds them equal.
11. Multiplexer 21b is enabled by comparator 19 to write Inst. A's results into storage location 14b. However, Inst. A's results may not overwrite Inst. B's reorder tag stored in ROBTAG8 51. Thus by using tag valid bits 46, multiplexer 21b writes Inst. A's results into ROB-TAG32 47 and ROBTAG16 49 only.

It is noted that the embodiment above may be modified to accommodate registers of size other than 32-bits, or registers with other addressing schemes.

In another embodiment, instruction storage 12 stores a series of last-in-line (LIL) bits which are used as enables for updating register file 17. For example, one LIL bit may indicate that the most significant two bytes of the destination register are updated by the instruction; a second LIL, bit may indicate that byte 1 (e.g. AH) is updated by the instruction; and a third LIL bit may indicate that byte 0 (e.g. AL) is updated by the instruction.

It is further noted that aspects regarding LIL bits and reorder buffers may be found in the co-pending, commonly assigned parent patent application entitled "A Reorder Buffer Having a Future File for Storing Speculative Instruction Execution Results", Ser. No. 08/690,370 filed Jun. 26, 1996 by Tran. The disclosure of this patent application is incorporated herein by reference in its entirety.

Figure 7A:
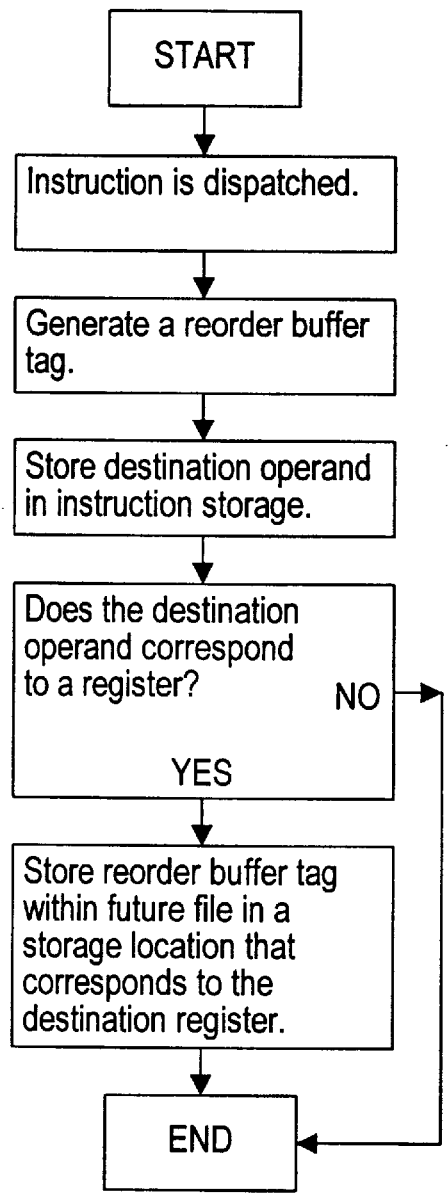
FIG. 7A is a diagram showing an embodiment of the method used in the reorder buffer of FIG. 1 as it relates to instruction dispatch.
Figure 7B:
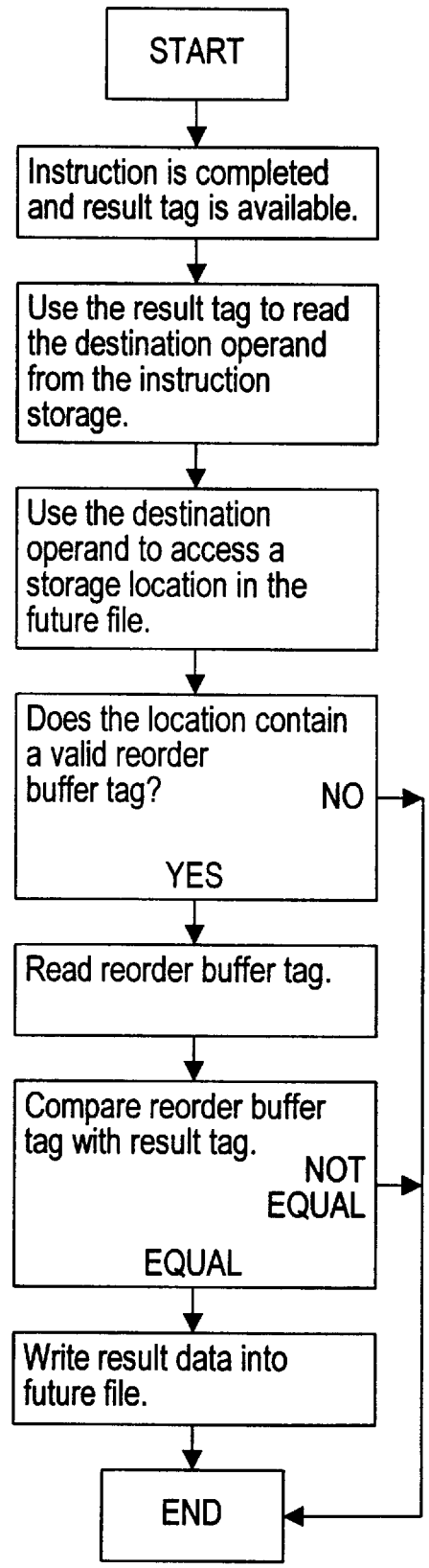
FIG. 7B is a diagram showing the method of FIG. 7A as it relates to instruction completion.

Turning to FIG. 7A and FIG. 7B, one embodiment of the method used by reorder buffer 10 is shown. FIG. 7A depicts one embodiment of the steps taken by reorder buffer 10 when an instruction is dispatched, while FIG. 7B depicts one embodiment of the steps taken by reorder buffer 10 when an instruction is completed and a result tag is available. While the steps are depicted in a linear fashion, steps may be performed in parallel.

Figure 8:
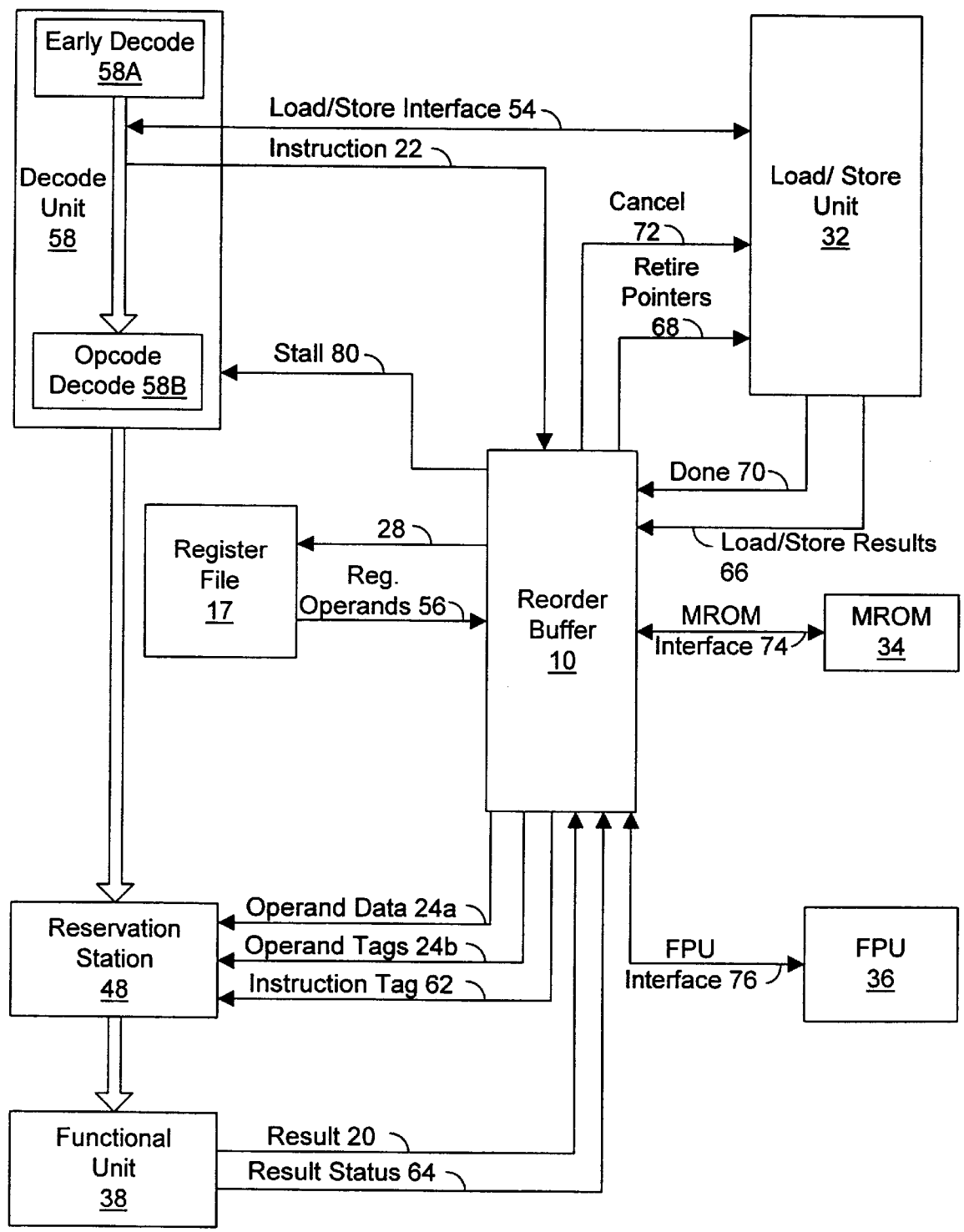
FIG. 8 is a diagram showing one embodiment of interconnections to the reorder buffer of FIG. 1.

Referring now to FIG. 8, one possible set of interconnections for using reorder buffer 10 within a microprocessor is shown. Other embodiments may employ other interconnection, and additional interconnection may be employed for other purposes. Furthermore, while one reservation station 48 and one functional unit 38 are shown in FIG. 8 for simplicity, multiple reservation stations and functional units are possible.

Decode unit 58 receives an instruction from the microprocessor's instruction alignment unit (not shown). Early decode unit 58A detects the operands used by the instruction and conveys indications of the register operands to reorder buffer 10 upon instruction bus 22. Register pointers are conveyed, and the source and/or destination nature of the operand is identified. For x86 instructions, up to two source operands may be identified, one of which is the destination operand as well. Still further, flag operands are identified upon instruction bus 22. In one embodiment, the flag operands are divided into three groups: the carry flag, the status and direction flags, and the remaining flags. For embodiments employing the x86 microprocessor architecture, the status and direction flags are the D, O, S, Z, P, and A flags. Immediate data is conveyed to reorder buffer 10 upon an immediate data bus (not shown). Reorder buffer 10 relays the immediate data upon operand data bus 24. Most x86 instructions specify either a second register operand or immediate data, but not both. Therefore, the portion of operand data bus 24 used to convey the second register operand value may be used to convey the immediate data. For branch instructions, the program counter address, an offset, and the predicted target address may be conveyed upon operand data bus 24.

Decode unit 58 additionally conveys certain information regarding the instruction to reorder buffer 10 upon an instruction bus 22. Additionally, early decode unit 58A detects load/store memory operations specified by the instruction. An indication of the memory operations is conveyed to load/store unit 32 via load/store interface 54.

In response to the operands conveyed upon instruction bus 22, reorder buffer 10 conveys register operand values (from future file 14) upon operand data bus 24a to reservation station 48.

Alternatively, future file 17 may be storing information regarding an instruction which updates the requested register. If the instruction has not yet executed, the reorder buffer tag locating the instruction within reorder buffer 10 is conveyed upon an operand tags bus 24b. One operand data value and one operand tag are provided for each source operand of the instruction upon operand data bus 24a and operand tags bus 24b, respectively. Additionally, validity indicators are asserted for each data and tag value by reorder buffer 10, such that reservation station 48 may discern which is being provided for a particular operand (e.g. data or reorder buffer tag).

In addition to providing operand values and tags, reorder buffer 10 provides an instruction tag for the instruction being dispatched to reservation station 48 upon an instruction tag bus 62. The instruction tag identifies the storage location within reorder buffer 10 which stores information regarding the instruction. The instruction tag is conveyed upon result bus 20 when the instruction is executed, such that the corresponding instruction result may be stored within reorder buffer 10. In one embodiment, instruction tag bus 62 conveys a line tag identifying the line of storage which stores the instruction information. The offset tag is a constant which is inherent in the issue position to which the instruction is conveyed. In other words, functional unit 38 provides results which are always stored at a particular offset within the lines of storage within reorder buffer 10.

In addition to storing the operand values and tags corresponding to an instruction, reservation station 48 receives the decoded instruction provided by opcode decode unit 58B. When each of the source operand values corresponding to the instruction have been provided by reorder buffer 10 or have been captured from result bus 20, the instruction may be selected for execution by functional unit 38. Upon selecting the instruction for execution, reservation station 48 conveys the decoded instruction and corresponding operands to functional unit 38.

Functional unit 38 executes instructions received from reservation station 48 and conveys the instruction tag corresponding to the instruction upon result bus 20 in addition to the instruction result generated therein. In one embodiment, the instruction tag is forwarded as the instruction begins execution but reorder buffer 10 does not receive the corresponding instruction result until the clock cycle following instruction execution. The instruction tag may be forwarded in this manner because it is unchanged during instruction execution, whereas the instruction result is generated by functional unit 38 and then forwarded. It is noted that result bus 20 is coupled to reservation station 48 for providing forwarded results thereto. Still further, result bus 20 may be coupled to load/store unit 32. Functional unit 38 would then provide the logical address of a memory operation specified by the instruction being executed therein to load/store unit 32 via result bus 20.

Functional unit 38 additionally forwards a result status upon a result status bus 64 to reorder buffer 10. The result status indicates any exceptions associated with the instruction, such that reorder buffer 10 may take appropriate corrective actions. Corrective actions may include hardware supported correction, trapping to a microcode routine within MROM unit 34, or trapping to a software routine stored at a particular address identified for the instruction. Result status bus 64 may additionally be used to indicate execution of a branch instruction which is mispredicted.

Reorder buffer 10 interfaces to load/store unit 32 to allow completion of load/store memory operations. Load/store unit 32 may be configured to speculatively execute load and store memory operations which hit in the data cache (not shown). Load memory operation results (along with a reorder buffer tag including both line tag and offset tag portions) are conveyed upon an LS results bus 66 to reorder buffer 10. Additionally, the load results are forwarded to reservation station 48 in order to provide operands thereto. In one embodiment, up to two results may be provided upon LS results bus 66.

Load/store unit 32 may be configured not to speculatively perform memory operations which miss the microprocessor's data cache. Reorder buffer 10 indicates upon retire pointers bus 68 which memory operations are otherwise in position to be retired but have not yet executed. Load/store unit 32 then performs the indicated memory operations and returns results upon LS results bus 66. Additionally, load/store unit 32 asserts a corresponding signal upon done bus 70. Reorder buffer 10 recognizes the asserted done signal as a completion of the memory operation indicated upon retire pointers bus 68. Since load/store unit 32 may execute up to two memory operations concurrently according to one embodiment, retire pointers bus 68 may carry up to two reorder buffer tags. Accordingly, done bus 70 includes one done signal for each of the two reorder buffer tags.

A cancel bus 72 is included between reorder buffer 10 and load/store unit 32 as well. Cancel bus 72 includes a signal for each reorder buffer tag conveyed upon retire pointers bus 68. If the corresponding cancel signal is asserted, then reorder buffer 10 is indicating that the corresponding memory operation should be deleted from load/store unit 32. Memory operations are deleted when they are subsequent to a mispredicted branch or an instruction which experienced an exception, for example.

Reorder buffer 10 interfaces with MROM unit 34 and FPU 36 via MROM interface 74 and FPU interface 76, respectively. MROM interface 74 is used (among other things) to implement branch misprediction recovery for branch instructions which originate in MROM unit 34 as opposed to the original instruction stream. If a mispredicted branch is encountered and the branch instruction originated within MROM unit 34, reorder buffer 10 informs MROM unit 34 via MROM interface 74. MROM interface 74 performs branch misprediction recovery for such mispredicted branch instructions.

Since FPU 36 operates as a coprocessor, several signals are used to synchronize completion of an instruction within FPU 36. These signals are included within FPU interface 76. Generally, a signal may be asserted to FPU 36 indicating that a particular floating point instruction may be retired. When the floating point instruction is retired, FPU 36 asserts a second signal. Additionally, upon detection of a floating point synchronization instruction, another set of signals are asserted to synchronize the completion of the instruction.

Instructions are retired from reorder buffer 10 in program order. Upon retirement, the corresponding register results are conveyed upon a retire bus 28 to register file 17. As noted above, the instructions within a line of storage are retired simultaneously. Since more than one instruction within the instructions may update the same register, reorder buffer 10 employs a set of bits within each line referred to as the last in line (LIL) bits. The LIL bits are set for each instruction which is the last instruction within the line to update a particular register. One bit is included for each portion of the register (i.e. EAX, AH, and AL, wherein AX is represented by both AH and AL being set). Effectively, these bits act as byte enables for updating the register. Therefore, an instruction which updates AH and another instruction which updates AL may retire simultaneously. For embodiments employing a microprocessor architecture which does not allow updates to only a portion of a register, one LIL bit is included for each instruction.

Finally, reorder buffer 10 employs a stall line 80 for stalling instruction dispatch. Instruction dispatch may be stalled for many reasons, including: reorder buffer, reservation station, or load/store buffer full conditions; a narrow to wide stall; instruction serialization; etc. Upon detection of a stall condition, reorder buffer 10 asserts a stall signal upon stall line 80. If decode unit 58 receives an asserted stall signal during a clock cycle and decode unit 58 is attempting to dispatch an instruction, decode unit 58 provides that same instruction during a subsequent clock cycle. In this manner, an instruction which cannot be dispatched during a particular clock cycle is continuously redispatched until the stalling condition terminates.

Turning now to FIG. 9, a block diagram of one embodiment of a microprocessor 110 is shown. Microprocessor 110 includes a prefetch/predecode unit 112, a branch prediction unit 114, an instruction cache 116, an instruction alignment unit 118, a plurality of decode units 58A–58C, a plurality of reservation stations 48A–48C, a plurality of functional units 38A–38C, a load/store unit 32, a data cache 128, a register file 17, a reorder buffer 10, and an MROM unit 34. Elements referred to herein with a particular reference number followed by a letter will be collectively referred to by the reference number alone. For example, decode units 58A–58C will be collectively referred to as decode units 58.

Prefetch/predecode unit 112 is coupled to receive instructions from a main memory subsystem (not shown), and is further coupled to instruction cache 116 and branch prediction unit 114. Similarly, branch prediction unit 114 is coupled to instruction cache 116. Still further, branch prediction unit 114 is coupled to decode units 58 and functional units 38. Instruction cache 116 is further coupled to MROM unit 34 and instruction alignment unit 118. Instruction alignment unit 118 is in turn coupled to decode units 58. Each decode unit 58A–58C is coupled to load/store unit 32 and to respective reservation stations 48A–48C. Reservation stations 48A–48C are further coupled to respective functional units 38A–38C. Additionally, decode units 58 and reservation stations 48 are coupled to reorder buffer 10. Functional units 38 are coupled to load/store unit 32 and reorder buffer 10 as well. Data cache 128 is coupled to load/store unit 32 and to the main memory subsystem. Finally, MROM unit 34 is coupled to decode units 58.

Generally speaking, instruction cache 116 is a high speed cache memory provided to store instructions. Instructions are fetched from instruction cache 116 and dispatched to decode units 58. In one embodiment, instruction cache 116 is configured to store up to 32 kilobytes of instructions in a 4 way set associative structure having 32 byte lines (a byte comprises 8 binary bits). Instruction cache 116 may additionally employ a way prediction scheme in order to speed access times to the instruction cache. Instead of accessing tags identifying each line of instructions and comparing the tags to the fetch address to select a way, instruction cache 116 predicts the way that is accessed. In this manner, the way is selected prior to accessing the instruction storage. The access time of instruction cache 116 may be similar to a direct-mapped cache. A tag comparison is performed and, if the way prediction is incorrect, the correct instructions are fetched and the incorrect instructions are discarded. It is noted that instruction cache 116 may be implemented as a fully associative, set associative, or direct mapped configuration.

Instructions are fetched from main memory and stored into instruction cache 116 by prefetch/predecode unit 112. Instructions may be prefetched prior to the request thereof from instruction cache 116 in accordance with a prefetch scheme. A variety of prefetch schemes may be employed by prefetch/predecode unit 112. As prefetch/predecode unit 112 transfers instructions from main memory to instruction cache 116, prefetch/predecode unit 112 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 58 or whether the instruction is executed by invoking a microcode procedure controlled by MROM unit 34, as will be described in greater detail below. Still further, prefetch/predecode unit 112 may be configured to detect branch instructions and to store branch prediction information corresponding to the branch instructions into branch prediction unit 114.

One encoding of the predecode tags for an embodiment of microprocessor 110 employing a variable byte length instruction set will next be described. A variable byte length instruction set is an instruction set in which different instructions may occupy differing numbers of bytes. An exemplary variable byte length instruction set employed by one embodiment of microprocessor 110 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 58 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 58 as the byte associated with the first clear functional bit in the instruction. For example, a fast path instruction including two prefix bytes, a Mod R/M byte, and an immediate byte would have start, end, and functional bits as follows:

| Start bits      | 10000 |
|-----------------|-------|
| End bits        | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 58. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 58. A listing of exemplary x86 instructions categorized as fast path instructions will be provided further below.

Microprocessor 110 employs branch prediction in order to speculatively fetch instructions subsequent to conditional branch instructions. Branch prediction unit 114 is included to perform branch prediction operations. In one embodiment, up to two branch target addresses are stored with respect to each 16 byte portion of each cache line in instruction cache 116. Prefetch/predecode unit 112 determines initial branch targets when a particular line is predecoded. Subsequent updates to the branch targets corresponding to a cache line may occur due to the execution of instructions within the cache line. Instruction cache 116 provides an indication of the instruction address being fetched, so that branch prediction unit 114 may determine which branch target addresses to select for forming a branch prediction. Decode units 58 and functional units 38 provide update information to branch prediction unit 114. Because branch prediction unit 114 stores two targets per 16 byte portion of the cache line, some branch instructions within the line may not be stored in branch prediction unit 114. Decode units 58 detect branch instructions which were not predicted by branch prediction unit 114. Functional units 38 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 110. A variety of suitable branch prediction algorithms may be employed by branch prediction unit 114.

Instructions fetched from instruction cache 116 are conveyed to instruction alignment unit 118. As instructions are fetched from instruction cache 116, the corresponding predecode data is scanned to provide information to instruction alignment unit 118 (and to MROM unit 34) regarding the instructions being fetched. Instruction alignment unit 118 utilizes the scanning data to align an instruction to each of decode units 58. In one embodiment, instruction alignment unit 118 aligns instructions from three sets of eight instruction bytes to decode units 58. Instructions are selected independently from each set of eight instruction bytes into preliminary issue positions. The preliminary issue positions are then merged to a set of aligned issue positions corresponding to decode units 58, such that the aligned issue positions contain the three instructions which are prior to other instructions within the preliminary issue positions in program order. Decode unit 58A receives an instruction which is prior to instructions concurrently received by decode units 58B and 58C (in program order). Similarly, decode unit 58B receives an instruction which is prior to the instruction concurrently received by decode unit 58C in program order.

Decode units 58 are configured to decode instructions received from instruction alignment unit 118. Register operand information is detected and routed to reorder buffer 10. Additionally, if the instructions require one or more memory operations to be performed, decode units 58 dispatch the memory operations to load/store unit 32. Each instruction is decoded into a set of control values for functional units 38, and these control values are dispatched to reservation stations 48 along with operand address information and displacement or immediate data which may be included with the instruction.

Microprocessor 110 supports out of order execution, and thus employs reorder buffer 10 to keep track of the original program sequence for register read and write operations, to implement register renaming, to allow for speculative instruction execution and branch misprediction recovery, and to facilitate precise exceptions. A temporary storage location within reorder buffer 10 is reserved upon decode of an instruction that involves the update of a register to thereby store speculative register states. If a branch prediction is incorrect, the results of speculatively-executed instructions along the mispredicted path can be invalidated in the buffer before they are written to register file 17. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exceptioncausing instruction, in which case the speculative results may be discarded by reorder buffer 10.

The instruction control values and immediate or displacement data provided at the outputs of decode units 58 are routed directly to respective reservation stations 48. In one embodiment, each reservation station 48 is capable of holding instruction information (i.e., instruction control values as well as operand values, operand tags and/or immediate data) for up to three pending instructions awaiting issue to the corresponding functional unit. It is noted that for the embodiment of FIG. 9, each reservation station 48 is associated with a dedicated functional unit 38. Accordingly, three dedicated "issue positions" are formed by reservation stations 48 and functional units 38. In other words, issue position 0 is formed by reservation station 48A and functional unit 38A. Instructions aligned and dispatched to reservation station 48A are executed by functional unit 38A. Similarly, issue position 1 is formed by reservation station 48B and functional unit 38B; and issue position 2 is formed by reservation station 48C and functional unit 38C.

Upon decode of a particular instruction, if a required operand is a register location, register address information is routed to reorder buffer 10. Those of skill in the art will appreciate that the x86 register file includes eight 32 bit real registers (i.e., typically referred to as EAX, EBX, ECX, EDX, EBP, ESI, EDI and ESP). In embodiments of microprocessor 110 which employ the x86 microprocessor architecture, register file 17 comprises storage locations for each of the 32 bit real registers. Additional storage locations may be included within register file 17 for use by MROM unit 34. Reorder buffer 10 contains temporary storage locations for results which change the contents of these registers to thereby allow out of order execution. A temporary storage location of reorder buffer 10 is reserved for each instruction which, upon decode, is determined to modify the contents of one of the real registers. Therefore, at various points during execution of a particular program, reorder buffer 10 may have one or more locations which contain the speculatively executed contents of a given register. If following decode of a given instruction it is determined that reorder buffer 10 has a previous location or locations assigned to a register used as an operand in the given instruction, the reorder buffer 10 forwards to the corresponding reservation station either: 1) the value in the most recently assigned location, or 2) a tag for the most recently assigned location if the value has not yet been produced by the functional unit that will eventually execute the previous instruction. The operand value (or reorder buffer tag) is provided from reorder buffer 10 rather than from register file 17. If the operand corresponds to a memory location, the operand value is provided to the reservation station through load/store unit 32.

In one particular embodiment, reorder buffer 10 is configured to store and manipulate concurrently decoded instructions as a unit. This configuration will be referred to herein as "line-oriented". By manipulating several instructions together, the hardware employed within reorder buffer 10 may be simplified. For example, a line-oriented reorder buffer included in the present embodiment allocates storage sufficient for instruction information pertaining to three instructions (one from each decode unit 58) whenever one or more instructions are dispatched by decode units 58. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 17 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 17 and freeing the corresponding storage is referred to as "retiring"

the instructions. It is further noted that any reorder buffer configuration may be employed in various embodiments of microprocessor 110.

As noted earlier, reservation stations 48 store instructions until the instructions are executed by the corresponding functional unit 38. An instruction is selected for execution if: (i) the operands of the instruction have been provided; and (ii) the operands have not yet been provided for instructions which are within the same reservation station 48A–48C and which are prior to the instruction in program order. It is noted that when an instruction is executed by one of the functional units 38, the result of that instruction is passed directly to any reservation stations 48 that are waiting for that result at the same time the result is passed to update reorder buffer 10 (this technique is commonly referred to as "result forwarding"). An instruction may be selected for execution and passed to a functional unit 38A–38C during the clock cycle that the associated result is forwarded. Reservation stations 48 route the forwarded result to the functional unit 38 in this case.

In one embodiment, each of the functional units 38 is configured to perform integer arithmetic operations of addition and subtraction, as well as shifts, rotates, logical operations, and branch operations. The operations are performed in response to the control values decoded for a particular instruction by decode units 58. It is noted that a floating point unit (not shown) may also be employed to accommodate floating point operations. The floating point unit may be operated as a coprocessor, receiving instructions from MROM unit 34 and subsequently communicating with reorder buffer 10 to complete the instructions. Additionally, functional units 38 may be configured to perform address generation for load and store memory operations performed by load/store unit 32.

Each of the functional units 38 also provides information regarding the execution of conditional branch instructions to the branch prediction unit 114. If a branch prediction was incorrect, branch prediction unit 114 flushes instructions subsequent to the mispredicted branch that have entered the instruction processing pipeline, and causes fetch of the required instructions from instruction cache 116 or main memory. It is noted that in such situations, results of instructions in the original program sequence which occur after the mispredicted branch instruction are discarded, including those which were speculatively executed and temporarily stored in load/store unit 32 and reorder buffer 10.

Results produced by functional units 38 are sent to reorder buffer 10 if a register value is being updated, and to load/store unit 32 if the contents of a memory location are changed. If the result is to be stored in a register, reorder buffer 10 stores the result in the location reserved for the value of the register when the instruction was decoded. A plurality of result buses 38 are included for forwarding of results from functional units 38 and load/store unit 32. Result buses 38 convey the result generated, as well as the reorder buffer tag identifying the instruction being executed.

Load/store unit 32 provides an interface between functional units 38 and data cache 128. In one embodiment, load/store unit 32 is configured with a load/store buffer having eight storage locations for data and address information for pending loads or stores. Decode units 58 arbitrate for access to the load/store unit 32. When the buffer is full, a decode unit must wait until load/store unit 32 has room for the pending load or store request information. Load/store unit 32 also performs dependency checking for load memory operations against pending store memory operations to ensure that data coherency is maintained. Load/store unit may also forward values or tags for memory operations that have not yet been retired. A memory operation is a transfer of data between microprocessor 110 and the main memory subsystem. Memory operations may be the result of an instruction which utilizes an operand stored in memory, or may be the result of a load/store instruction which causes the data transfer but no other operation. Additionally, load/store unit 32 may include a special register storage for special registers such as the segment registers and other registers related to the address translation mechanism defined by the x86 microprocessor architecture.

In one embodiment, load/store unit 32 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 32 may be configured to perform any amount of speculative execution, including no speculative execution.

Data cache 128 is a high speed cache memory provided to temporarily store data being transferred between load/store unit 32 and the main memory subsystem. In one embodiment, data cache 128 has a capacity of storing up to sixteen kilobytes of data in an eight way set associative structure. Similar to instruction cache 116, data cache 128 may employ a way prediction mechanism. It is understood that data cache 128 may be implemented in a variety of specific memory configurations, including a set associative configuration.

In one particular embodiment of microprocessor 110 employing the x86 microprocessor architecture, instruction cache 116 and data cache 128 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 10:
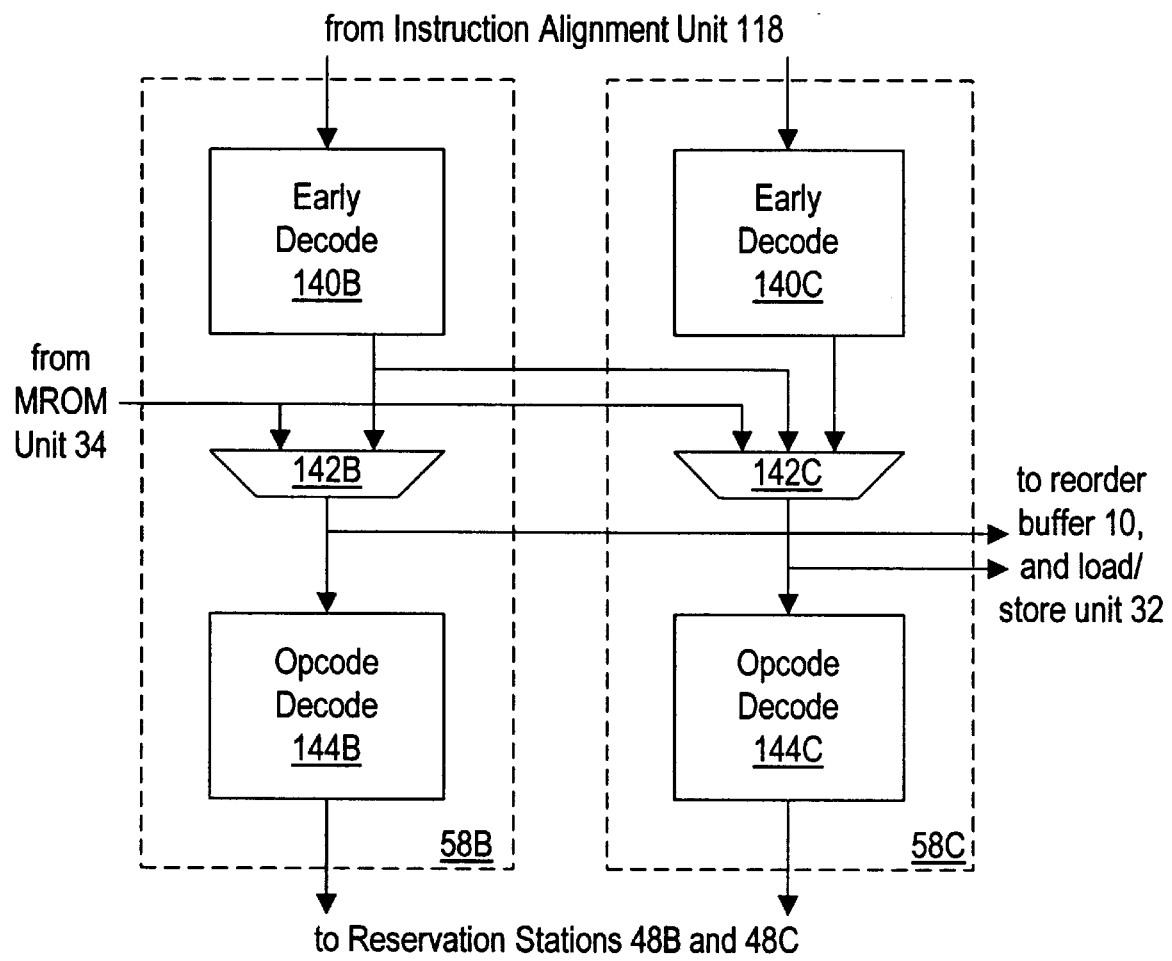
FIG. 10 is a diagram showing detail of the decode units of the microprocessor of FIG. 9.

Turning now to FIG. 10, a block diagram of one embodiment of decode units 58B and 58C are shown. Each decode unit 58 receives an instruction from instruction alignment unit 118. Additionally, MROM unit 34 is coupled to each decode unit 58 for dispatching fast path instructions corresponding to a particular MROM instruction. Decode unit 58B comprises early decode unit 140B, multiplexer 142B, and opcode decode unit 144B. Similarly, decode unit 58C includes early decode unit 140C, multiplexer 142C, and opcode decode unit 144C.

Certain instructions in the x86 instruction set are both fairly complicated and frequently used. In one embodiment of microprocessor 110, such instructions include more complex operations than the hardware included within a particular functional unit 38 is configured to perform. Such instructions are classified as a special type of MROM instruction referred to as a "double dispatch" instruction. These instructions are dispatched to a pair of opcode decode units 144B and 144C. It is noted that opcode decode units 144B and 144C are coupled to reservation stations 48B and 48C, respectively. Each of opcode decode units 58 forms an issue position with the corresponding reservation station 48 and functional unit 38. Instructions are passed from an opcode decode unit 144 to the corresponding reservation station 48 and further to the corresponding functional unit 38.

Multiplexer 142B is included for selecting between the instructions provided by MROM unit 34 and by early decode unit 140B. During times in which MROM unit 34 is dispatching instructions, multiplexer 142B selects instructions provided by MROM unit 34. At other times, multiplexer 142B selects instructions provided by early decode unit 140B. Similarly, multiplexer 142C selects between instructions provided by MROM unit 34, early decode unit 140B, and early decode unit 140C. The instruction from MROM unit 34 is selected during times in which MROM unit 34 is dispatching instructions. During times in which early decode unit 140A detects a double dispatch instruction, the instruction from early decode unit 140B is selected by multiplexer 142C. Otherwise, the instruction from early decode unit 140C is selected. Selecting the instruction from early decode unit 140B into opcode decode unit 144C allows a fast path instruction decoded by decode unit 58B to be dispatched concurrently with a double dispatch instruction decoded by decode unit 58A.

According to one embodiment employing the x86 instruction set, early decode units 140 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 144 are configured to decode the opcode of the instruction, producing control values for functional units 38. Displacement and immediate data are routed with the control values to reservation stations 48.

Since early decode units 140 detect operands, the outputs of multiplexers 142 are routed to register file 17 and reorder buffer 10. Operand values or tags may thereby be routed to reservation stations 48. Additionally, memory operands are detected by early decode units 140. Therefore, the outputs of multiplexers 142 are routed to load/store unit 32. Memory operations corresponding to instructions having memory operands are stored by load/store unit 32.

Figure 11:
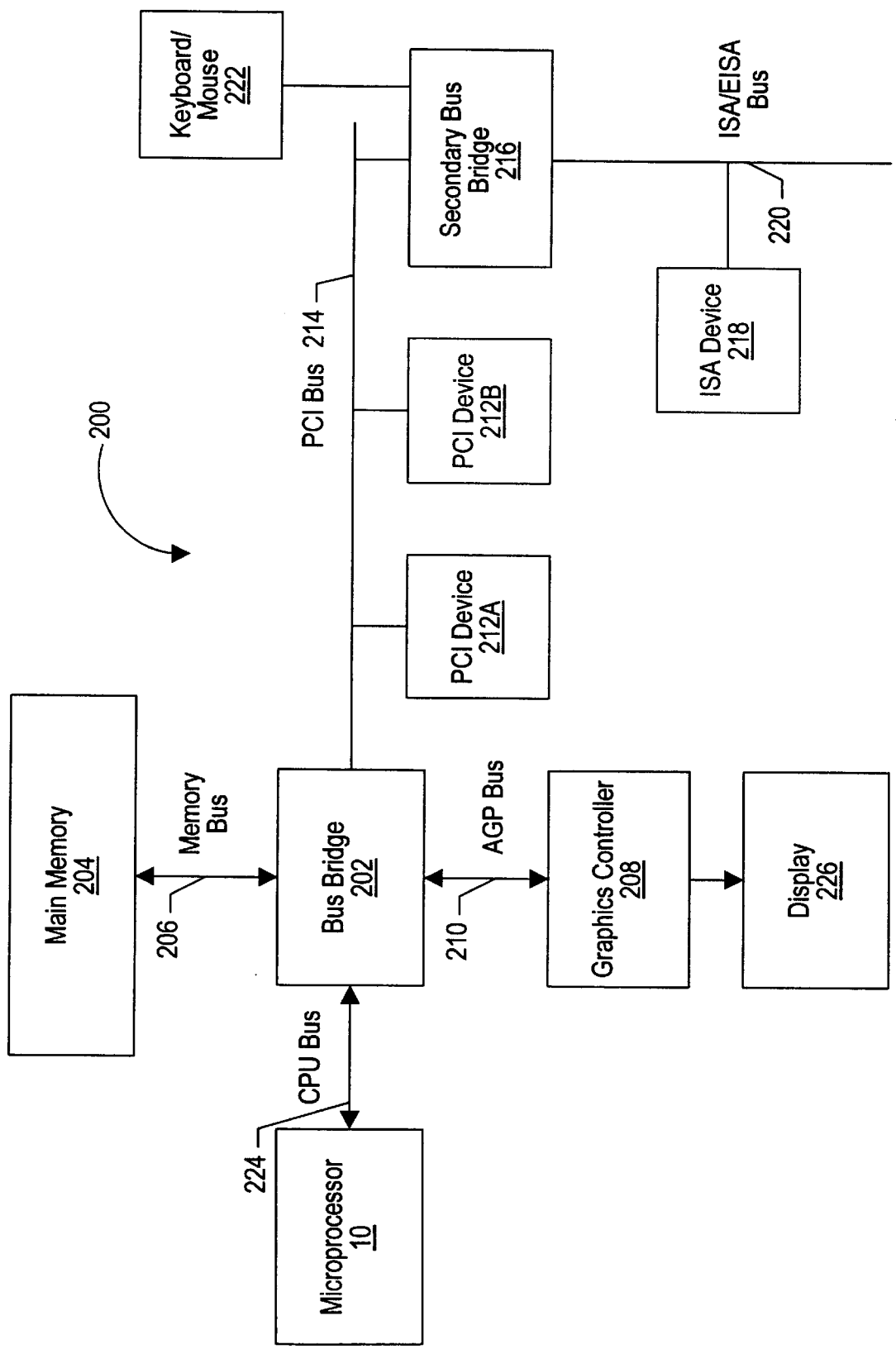
FIG. 11 is a diagram showing one embodiment of a computer system configured to utilize the microprocessor of FIG. 9.

Turning now to FIG. 11, a block diagram of one embodiment of a computer system 200 including microprocessor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc. It is noted that, while the AGP, PCI, and ISA or EISA buses have been used as examples in the above description, any bus architectures may be substituted as desired.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A reorder buffer for use in a microprocessor comprising:

an instruction storage configured to store instruction information and generate reorder buffer tags corresponding to multiple instructions outstanding within said microprocessor;

a future file having a plurality of storage locations associated with each register implemented in said microprocessor, wherein each storage location is configured to store a reorder buffer tag that corresponds to a particular instruction, wherein said particular instruction is the last instruction, in program order, represented within said instruction storage that has a destination operand corresponding to the register associated with said storage location, and wherein said future file is further configured to store instruction results that correspond to said particular instruction when said instruction results are provided; and a control unit coupled to said instruction storage and to said future file, wherein said control unit is configured to recover said future file upon a branch misprediction by: reading the entries in said instruction storage, in reverse program order and beginning with said mispredicted instruction; writing instruction results, if available, into said future file for each entry having a destination operand corresponding to a register; and writing a reorder buffer tag into said future file for each entry without instruction results having a destination operand corresponding to a register.

2. The reorder buffer as recited in claim 1 wherein said future file is configured to store a mask bit for each storage location within said future file.

3. The reorder buffer as recited in claim 2 wherein said instruction storage is configured to store a plurality of cancel bits for determining where instruction information may be stored.

4. The reorder buffer as recited in claim 3 wherein said instruction storage is configured to purge any stored instruction information corresponding to instructions occurring after the mispredicted branch instruction in program order.

5. The reorder buffer as recited in claim 4 wherein said plurality of storage locations are configured to store either said reorder buffer tag or said instruction results.

6. The reorder buffer as recited in claim 5 wherein one of said plurality of storage locations within said future file is initialized to said reorder buffer tag upon dispatch of a particular instruction.

7. The reorder buffer as recited in claim 6 wherein said future file is further configured to store a plurality of reorder buffer tags, wherein said plurality of reorder buffer tags correspond to a plurality of instructions which update different portions of said register.

8. The reorder buffer as recited in claim 7 wherein said storage location is divided into a first portion and a second portion, and wherein said first portion of said storage location corresponds to a first portion of a register, and wherein said second portion of said storage location corresponds to a second portion of said register, and wherein each of said first portion of said storage location and said second portion of said storage location is configured to store a reorder buffer tag of an instruction which updates said first portion of said register and said second portion of said register, respectively, and wherein each of said first portion of said storage location and said second portion of said storage location is configured to store data corresponding to an instruction result of said instruction identified by said reorder buffer tag, respectively, and wherein said data replaces said reorder buffer tag when said data is provided;

and wherein said control unit is configured to store a first reorder buffer tag into said first portion of said storage location if said instruction updates said first portion of said register, and wherein said control unit is further configured to store said first reorder buffer tag into said second portion of said storage location if said instruction updates said second portion of said register.

9. The reorder buffer as recited in claim 8 wherein said instruction storage is line-oriented.

10. The reorder buffer as recited in claim 8 wherein said control unit is further configured to store said instruction results into said first portion of said storage location if said instruction results update said first portion of said register, and wherein said second control unit is configured to store said instruction results into said second portion of said storage location if said instruction results update said second portion of said register.

11. The reorder buffer as recited in claim 10 wherein said control unit is configured to store a particular instruction result into both said first portion of said storage location and said second portion of said storage location if said particular instruction result updates both said first portion of said register and said second portion of said register.

12. The reorder buffer as recited in claim 11 wherein said first portion of said register includes said second portion of said register.

13. The reorder buffer as recited in claim 12 wherein said storage location further stores an indication that an outstanding instruction updates both said first portion of said register and said second portion of said register.

14. The reorder buffer as recited in claim 13 wherein said future file further comprises a series of valid bit storage locations for storing information as to the validity of the contents of said storage locations within said future file.

15. The reorder buffer as recited in claim 14 wherein said instruction information comprises destination operand size information.

16. The reorder buffer as recited in claim 15 wherein said instruction storage stores said reorder buffers generated by said instruction storage.

17. A reorder buffer for use in a microprocessor comprising:

an instruction storage configured to store instruction results, destination operand information, and reorder buffer tags corresponding to multiple instructions outstanding within said microprocessor;

a future file having a storage location for each register implemented in said microprocessor, wherein each storage location is configured to store a reorder buffer tag that corresponds to a particular instruction, wherein said particular instruction is the last instruction, in program order, represented within said instruction storage that has a destination operand corresponding to the register associated with said storage location, and wherein said future file is further configured to store instruction results that correspond to said particular instruction when said instruction results are provided; and a control unit coupled to said instruction storage and to said future file, wherein said control unit is configured to recover said future file upon a branch misprediction by reading the entries in said instruction storage, in reverse program order and beginning with said mispredicted instruction, and then writing instruction information, which corresponds to the entry being read, into said future file for each entry having a destination operand corresponding to a register.

18. The reorder buffer as recited in claim 17, wherein said instruction information comprises instruction results for executed instructions and a reorder buffer tag for unexecuted instructions.

19. A method of recovering a reorder buffer, having an instruction storage and a future file, after a mispredicted branch instruction comprising:

examining each entry in said instruction storage for a valid destination, wherein said examining starts with said mispredicted branch instruction and continues in reverse program order, and wherein a valid destination corresponds to a register;

writing a reorder buffer tag into said future file for each unexecuted entry in said instruction storage having a valid register destination;

writing instruction results into said future file for each executed entry in said instruction storage having a valid register destination; and copying the contents of each register from said register file to a corresponding location in said future file if said corresponding location has not been written to during said recovering step.

20. The method as recited in claim 19, further comprising the steps of:

resetting all mask bits associated with said future file, wherein each mask bit corresponds to a different register; and setting the mask bit corresponding to the register corresponding to a valid entry in said instruction storage, wherein the step of copying is only performed for registers whose corresponding mask bit has not been set.

21. A computer system comprising:

a CPU;

a main memory subsystem; and a modem, wherein said CPU, said main memory subsystem, and said modem are connected by a bus bridge, and wherein said microprocessor comprises:
an instruction cache; and
a reorder buffer having:
an instruction storage configured to store instruction information and generate reorder buffer tags corresponding to multiple instructions outstanding within said microprocessor;
a future file having a plurality of storage locations, wherein each storage location is associated with a register implemented in said microprocessor, wherein each storage location is configured to store a reorder buffer tag that corresponds to a particular instruction, wherein said particular instruction is the last instruction, in program order, represented within said instruction storage that has a destination operand corresponding to the register associated with said storage location, and wherein said future file is further configured to store instruction results that correspond to said particular instruction when said instruction results are provided; and
a control unit coupled to said instruction storage and to said future file, wherein said control unit is configured to recover said future file upon a branch misprediction by: reading the entries in said instruction storage, in reverse program order and beginning with said mispredicted instruction; writing instruction results, if available, into said future file for each entry having a destination operand corresponding to a register; and writing a reorder buffer tag into said future file for each entry without instruction results having a destination operand corresponding to a register.

22. The computer system as recited in claim 21, wherein said reorder buffer is configured to purge any instruction information stored in said instruction storage that corresponds to instructions occurring after the mispredicted branch instruction in program order.

23. A microprocessor comprising:

an instruction cache; and a reorder buffer, wherein said reorder buffer comprises:
an instruction storage configured to store instruction information and generate reorder buffer tags corresponding to multiple instructions outstanding within said microprocessor;
a future file having a plurality of storage locations, wherein each storage location is associated with a register implemented in said microprocessor, wherein each storage location is configured to store a reorder buffer tag that corresponds to a particular instruction, wherein said particular instruction is the last instruction, in program order, represented within said instruction storage that has a destination operand corresponding to the register associated with said storage location, and wherein said future file is further configured to store instruction results that correspond to said particular instruction when said instruction results are provided; and
a control unit coupled to said instruction storage and to said future file, wherein said control unit is configured to recover said future file upon a branch misprediction by: reading the entries in said instruction storage, in reverse program order and beginning with said mispredicted instruction; writing instruction results, if available, into said future file for each entry having a destination operand corresponding to a register; and writing a reorder buffer tag into said future file for each entry without instruction results having a destination operand corresponding to a register.

24. The microprocessor as recited in claim 23, wherein said reorder buffer is configured to purge any instruction information stored in said instruction storage that corresponds to instructions occurring after the mispredicted branch instruction in program order.

* * * * *